(12) United States Patent
Hughes et al.

(10) Patent No.: US 7,623,697 B1
(45) Date of Patent: Nov. 24, 2009

(54) LINKING OF IMAGES TO ENABLE SIMULTANEOUS VIEWING OF MULTIPLE OBJECTS

(75) Inventors: William Hughes, Manchester (GB); Duncan William Borthwick, Northumberland (GB)

(73) Assignee: Genetix Corp., San Jose, CA (US)

( * ) Notice: Subject to any disclaimer, the term of this patent is extended or adjusted under 35 U.S.C. 154(b) by 697 days.

(21) Appl. No.: 10/901,875

(22) Filed: Jul. 28, 2004

(51) Int. Cl.
*G06K 9/00* (2006.01)
*G06G 5/00* (2006.01)

(52) U.S. Cl. .................................. 382/133; 345/626
(58) Field of Classification Search ................ 382/128, 382/133; 345/626
See application file for complete search history.

(56) References Cited

U.S. PATENT DOCUMENTS 7,033,819 B2 * 4/2006 Kim et al. ................ 435/286.2
7,236,258 B2 * 6/2007 Wen et al. .................. 358/1.12
7,382,909 B1 * 6/2008 Nattkemper et al. ........ 382/133

OTHER PUBLICATIONS

Michael Lennox and Elizabeth Bulger, Adobe Photoshop 5.0 Certification Guide, Jan. 1999, pp. 46-48, 81, 113-130, 187, 188, 213-215, 242-250.*

* cited by examiner

*Primary Examiner*—Bhavesh M Mehta
*Assistant Examiner*—Soo Jin Park
(74) *Attorney, Agent, or Firm*—Townsend and Townsend and Crew LLP

(57) ABSTRACT

Computerized techniques are provided for linking digitized images of serial sections of a biological tissue sample. Linked, digitized images of the serial section are displayed on a display and manipulation of one digitized image causes other digitized images to be similarly manipulated. To link digitized images, a copy of a digitized image of one serial section is positioned over a digitized image of another serial section. The digitized image of the other serial section is visible through the copy. The transparency of the copy is changed to effect change of the visualization of the digitized image of the other serial section. The copy is registered to the digitized image of the other serial section.

21 Claims, 22 Drawing Sheets

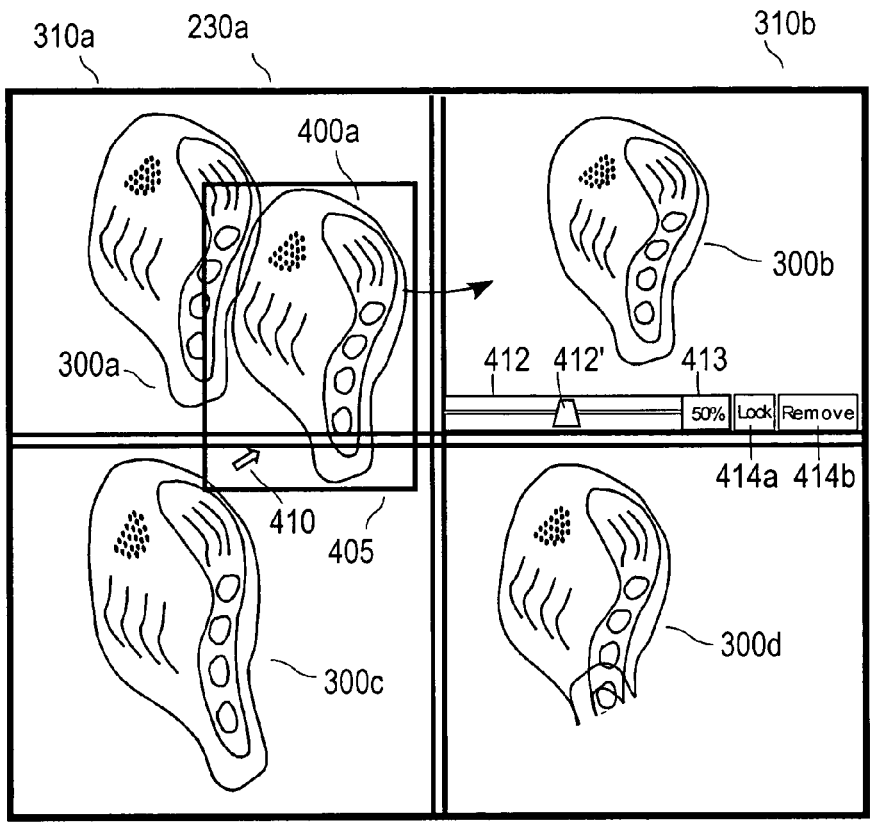
FIG. 4B'
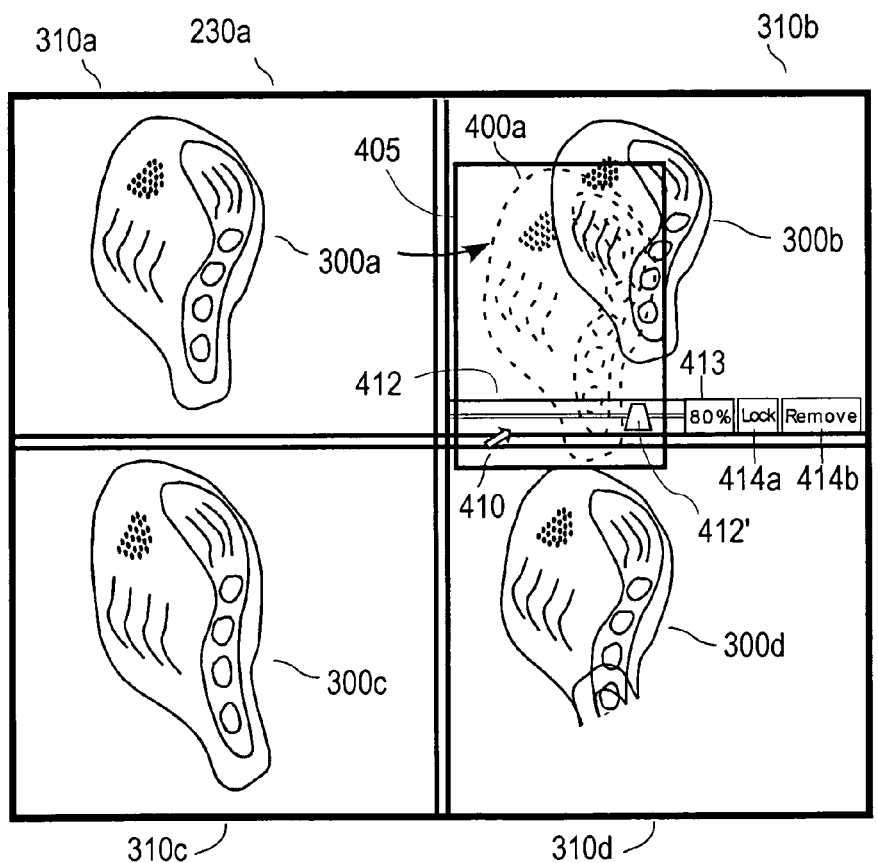
FIG. 4B"

LINKING OF IMAGES TO ENABLE SIMULTANEOUS VIEWING OF MULTIPLE OBJECTS

BACKGROUND OF THE INVENTION

This invention relates generally to the analysis of samples such as biological tissue samples that are chemically stained for protein based markers, and more specifically to the use of a linking system and method for linking sets of images of the samples in such analysis.

Visual analysis of biological tissue samples often involves slicing the biological tissue samples into thin cross sections, often referred to as serial sections, to visualize structures of interest within the biological tissue sample. The serial sections are typically mounted on glass or plastic microscope slides. Visual analysis of mounted serial sections is often carried out by the naked eye (grossly) or by microscopy. In a typical slicing process, a tissue sample is dehydrated and embedded in paraffin to lend rigidity to the sample during slicing and mounting on slides. Tissue samples are typically sliced into serial sections that are about 4-9 micrometers ($\mu$m) thick; however, other useful thicknesses are sliced. Once sliced, the serial sections are typically floated in water onto the microscope slides and moved into an appropriate location by a technician who physically manipulates the serial sections using, for example, a pair of tweezers or artist's brush. Being relatively thin, the serial sections are relatively delicate and when placed on microscope slides tend to deform by stretching, shrinking, being compressed, folding or a combination thereof. Moreover, the serial sections also tend to be placed on the microscope slides in rotated positions relative to one another. Such deformations and relative rotations often add to the difficulty in cross comparing serial sections.

Coherent

Serial sections of a tissue sample are typically cross-compared by histologists and pathologists, as well as others, to identify and locate the same tissue structure through the serial sections. For example, pathologists often cross compare serial sections that have been variously stained to aid in identifying and locating tissue structures of interest, such as groups of cancer cells or pre-cancerous cells. Stains of use have different affinities for different tissue structures and tend to color more intensely structures for which the stains have relatively high affinity. For example, a first serial section of a tissue sample is often stained with haematoxylin and eosin, referred to as H&E staining. Haematoxylin has a relatively high affinity for nuclei, while eosin has a relatively high affinity for cytoplasm. H&E stained tissue gives the pathologist important morphological and positional information about tissue of interest. For example, typical H&E staining colors nuclei blue-black, cytoplasm varying shades of pink, muscle fibers deep pinky red, fibrin deep pink, and red blood cells orange/red. The pathologist uses positional (e.g., color) information derived from the H&E stained tissue to estimate the location of corresponding tissue regions on successive serial sections of the tissue that are typically immunohistochemically stained. The successive serial sections may be immunohistochemically stained, for example, with HER-2/neu protein (a membrane-specific marker), Ki67 protein (a nuclei-specific marker), or other known stains. The use of such stains is well known in the art and will not be discussed in further detail.

Positional information derived from H&E stained serial sections is often crudely used to locate corresponding tissue on immunohistochemically stained serial sections. Pathologists commonly hold two or more slides up to a light and grossly attempt to judge the relative locations of structures of interest. As corresponding tissues may be distorted compared to the H&E section, and/or in a different location or orientation, position estimates may be many millimeters off leading to poor and/or lengthy-repetitious analysis.

Poor and lengthy analysis arise not only in naked eye analysis of serial sections but also in computer-aided analysis of serial sections. Images of serial sections are often digitized and stored in a computer for computer-aided analysis. Present computer-aided analysis techniques do not correct for distortions and relative rotations of serial sections captured in digital images of these sections. As a result of the distortion and relative rotations of a set of serial images captured in digitized images, using location information derived from one serial-section image to locate structures in another serial-section image using computer-aided techniques is a laborious process fraught with misidentification and lengthy, repetitious analysis.

Accordingly, what is needed in the fields of pathology, histology, morphology, and others are new and useful methods and tools to simplify and automate cross comparisons of serial sections. Also needed are new and useful methods and tools that provide improved positional accuracy during cross comparison of serial-section images by correcting for serial section deformations and relative rotations that often arise during serial section slicing and mounting.

SUMMARY OF THE INVENTION

The present invention provides a computerized system and technique for linking digitized images of serial sections for viewing of a biological tissue sample having microscopic features of interest.

In short, this is made possible by the use of a computerized system and computerized techniques for linking the digitized images of the serial sections. In a method of linking digitized images of serial sections, according to one embodiment, the digitized images of the serial sections are displayed on a computer display that is controlled by a computer, a copy of a digitized image of a first serial section is created, and the copy is referred to as the ghost image or transparent image. The ghost image is positioned over a digitized image of a second serial section. The digitized image of the second serial section is visible through the ghost image and is referred to as the underlying image. The transparency of the ghost image is increased or decreased to effect change of the visualization of the digitized image of the other serial section. The ghost image is registered to the underlying image, and the ghost image and the underlying image are linked such that when manipulations are performed on either the ghost image or the underlying image, the other of the images is similarly manipulated.

In a method of linking digitized images of serial sections displayed on a computer display controlled by a computer, according to another embodiment, a copy of a first serial-section image is created, the copy being referred to as the ghost image. The ghost image is positioned over a second serial-section image. The digitized image of the second serial section is visible through the ghost image and is referred to as the underlying image. The ghost image is registered to the underlying image. The first serial-section image and the second serial-section image are linked for portions of the ghost image that correspond to the first serial-section image and that overly the underlying image. An analysis boundary is manually drawn around a portion of the first serial-section image. Another analysis boundary is automatically drawn by the computer around a portion of the second-serial image that corresponds to the portion of the first serial-section image. Thereafter, the portion of the first serial-section image and the portion of the second serial-section image are automatically analyzed by the computer.

According to yet another embodiment, a system is provided for digitizing magnified images of serial sections of a biological tissue sample and adjusting for deformations and relative rotations of the serial sections imaged in the digitized images; the system includes comprises a computer system including a display, a memory, and an input device, wherein the computer is configured to: (i) receive the digitized images from a digital image generation device, store the digitized images in the memory, and display the digitized images on the display; (ii) create a copy of one of the digitized images of a first serial section, the copy is referred to as the ghost image; (iii) position the ghost image over another of the digitized images of a second serial section, the digitized image of the second serial section being visible through the ghost image and is referred to as the underlying image; (iv) change the transparency of the ghost image; (v) register the ghost image to the underlying image; and (vi) link the ghost image and the underlying image such that when manipulations are performed on either the ghost image or the underlying image, the other of the images is similarly manipulated.

A further understanding of the nature and advantages of the present invention may be realized by reference to the remaining portions of the specification and the drawings.

BRIEF DESCRIPTION OF THE DRAWINGS

FIG. 4A' is a simplified schematic of a graphical user interface (GUI) that includes three serial-section images, wherein a reference-link region includes the entire first serial-section image, which may be selected for inclusion in the reference-link region by pressing a select GUI button in one of the tool bars 408a, 408b, or 408c or by other selection means;

FIG. 4A" is a simplified schematic of GUI that includes three serial-section images according to another embodiment of the present invention;

FIG. 4B' is a simplified schematic of a number of screen windows, wherein at least one screen window includes a slider bar that is configured to change the transparency of a ghost image;

FIG. 4B" is a simplified schematic of the slider bar showing slider moved right of center on the slider bar, such that the ghost image has a transparency of 80%;

DETAILED DESCRIPTION OF THE INVENTION

Overview

The present invention provides a system and a technique for using the system for cross-comparing and analyzing cross sections (or "serial sections") of biological tissue samples, such as tumorous tissues, using a computer to correct for deformations of the serial sections captured in digitized images. Systems and techniques are also provided for correcting relative rotational displacement of the digitized images and for linking the digitized images, such that graphical manipulations performed on one serial image are similarly performed on linked serial images.

A particular application of the present invention is in the field of pathology, and other medical or bioscience fields, to correct for distortion and relative rotations between digitized images of serial sections variously stained to color select structures of interest in the serial sections. A first serial section of a tissue sample, often used as a reference section, is typically stained with haematoxylin and eosin, and is commonly referred to as an H&E section. Subsequent serial sections of the tissue sample are often immunohistochemically stained with makers to color and aid in locating structures of interest, such as cancerous and pre-cancerous cells. Known immunohistochemical stains include, for example, HER-2/nue protein, Ki67 protein, ER, and PgR.

Figure 1:
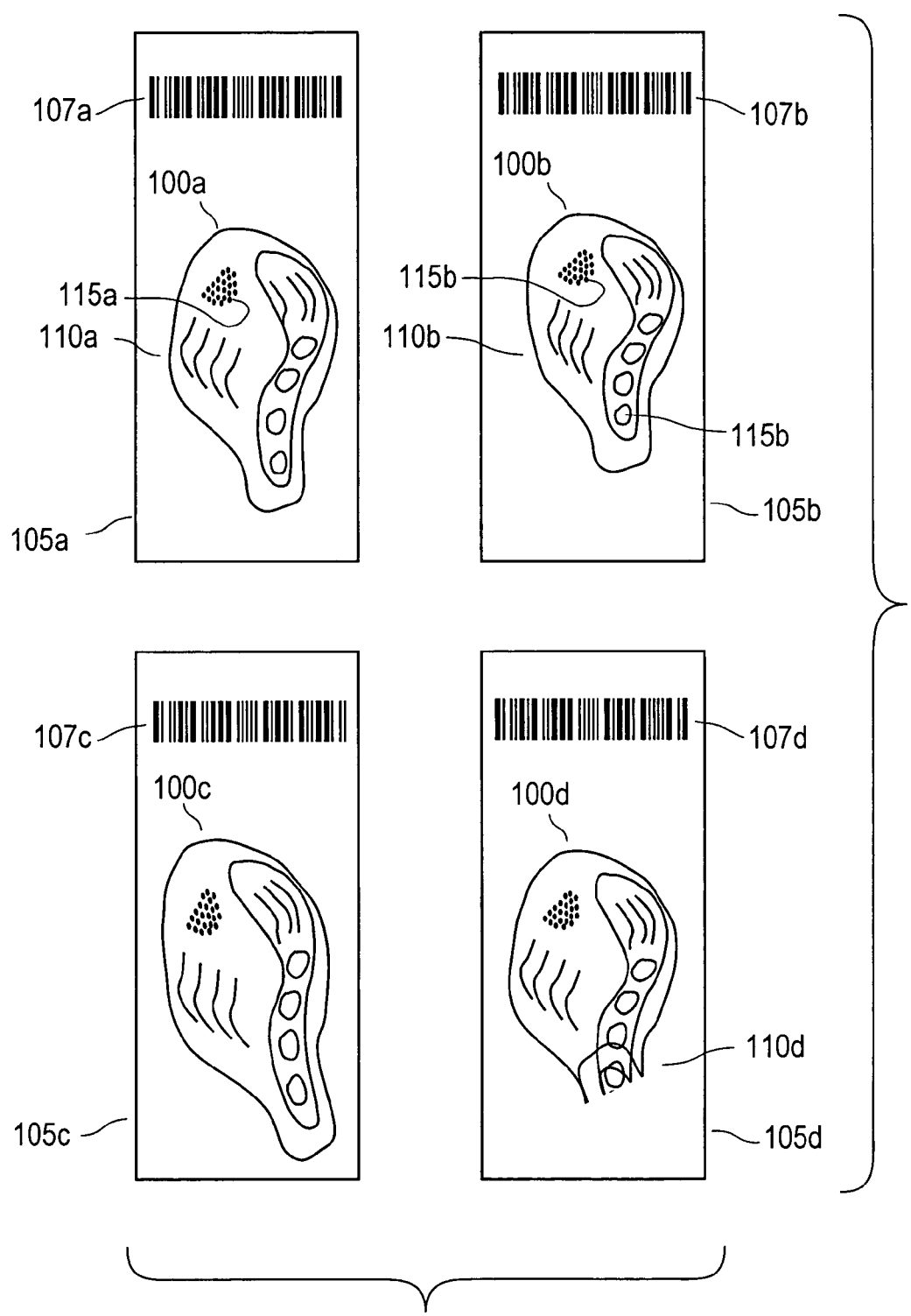
FIG. 1 is a schematic of a set of serial sections of a tissue sample according to an embodiment of the present invention.

FIG. 1 is a schematic of set of serial sections of a tissue sample according to an embodiment of the present invention. The serial sections are labeled 100a-100d and are mounted respectively on microscope slides 105a-105d. The microscope slides may optionally include respective bar codes 107a-107d for identifying and cataloging the serial sections. The serial sections may be any tissue sample of interest, such as a lymph node having cancerous or pre-cancerous cells. As with most serial sections of a tissue sample, serial sections 100a-100d are distorted or deformed with respect to one another. For example, serial section 100b is shown to be compressed in region 110b as compared with the corresponding region 110a of serial section 100a. Serial section 100b is also shown to be vertically compressed relative to serial section 100a. In addition to being compressed, serial sections are also stretched. For example, serial section 100c is shown to be vertically stretched. Serial section 100c is also shown to be rotated relative to the other serial sections. Another common deformation is the folding of a portion of a serial section, such as that shown in region 110d of serial section 100d.

The deformations and relative rotations shown in serial sections 100a-100d typically occur during slicing and during mounting of the serial sections onto respective microscope slides 105a-105d. For example, serial section compressions, such as the compression in region 110b of serial section 110b, may occur as the serial section is mounted onto microscope slide 105b by a laboratory technician coaxing the serial section into place on the microscope slide with, for example, a pair of tweezers or an artist's brush.

Deformations and relative rotations of serial sections often make cross comparisons between serial sections relatively difficult. For example, location information of a structure 115a derived from serial section 100a may provide limited help in locating the corresponding structure 115b in serial section 100b as structures 115a and 115b are in different relative locations within their respective serial sections as a result of compression in region 110b of serial section 100b. This and other cross comparison difficulties are addressed by embodiments of the present invention.

Microscope and Computer System

Figure 2:
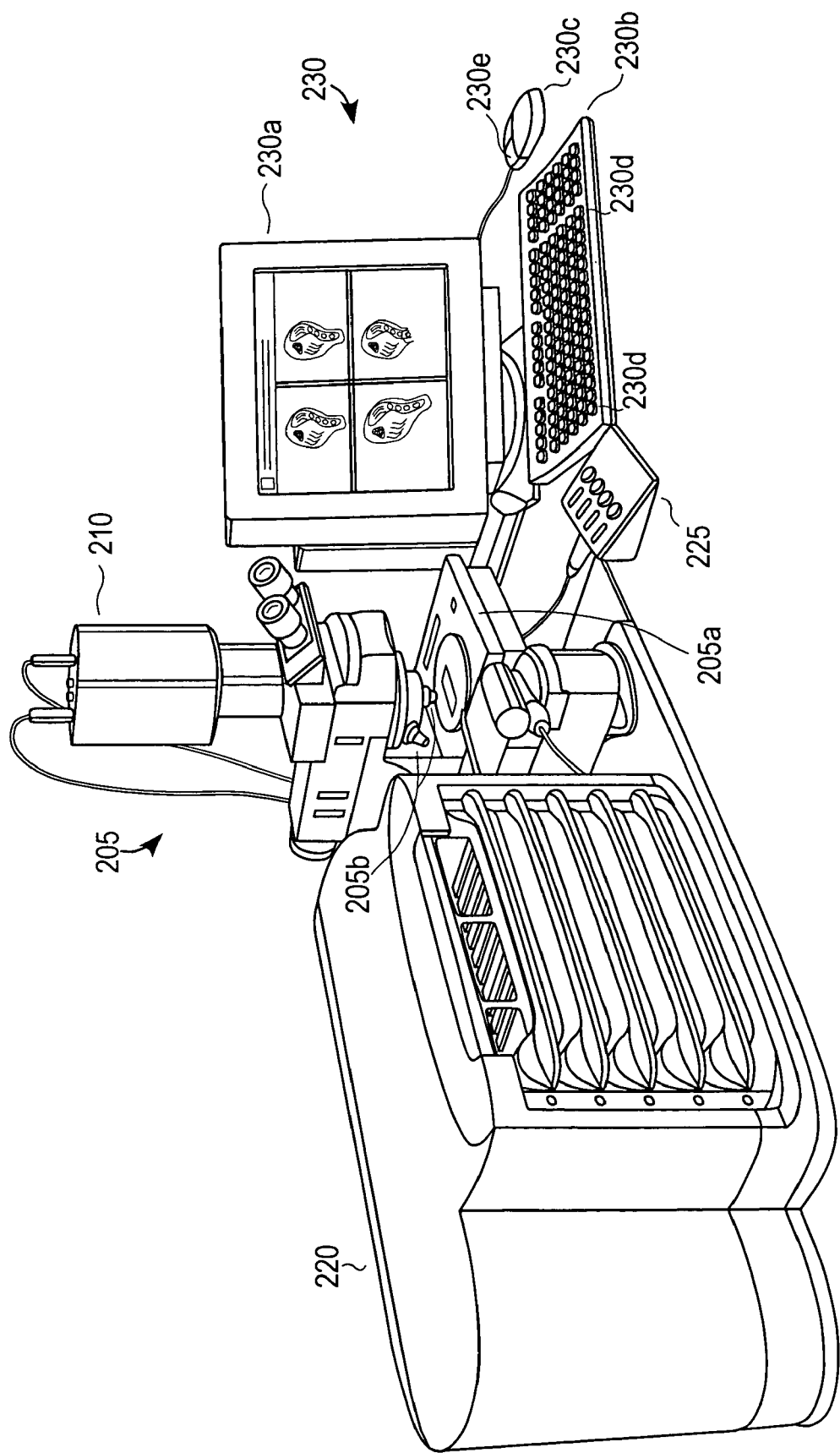
FIG. 2 is a simplified schematic of a system for generating, storing, and processing digitized images of serial sections according to an embodiment of the present invention.

FIG. 2 is a simplified schematic of a system 200 for generating, storing, and processing digitized images of serial sections, such as images of serial sections 100a-100d, according to an embodiment of the present invention. According to one embodiment, system 200 is the ARIOL SL-50™ system manufactured by Applied Imaging Corporation, owner of the present invention. System 200 includes a microscope 205 with an attached camera 210, a slide loader 220, a stage manipulator 225, and a computer 230. System 200 is presently described in greater detail.

Microscope 205 magnifies images of the serial sections, usually, but not necessarily, one at a time, for ocular display and for image capture by camera 210. Microscope 205 is configured to magnify images of the serial sections at variety of magnifications, such as, but not limited to, 1.25×, 5×, 10×, 20×, and 40×. According to one embodiment, microscope 205 is a BX-61™ microscope manufactured by Olympus America, Inc. According to one embodiment, camera 210 is a 4912 CCIR™ camera manufactured by COHU, Inc. and has a 752×582 active-CCD-pixel matrix. The active-CCD-pixel matrix digitizes images of serial sections for delivery to computer 230.

Slide loader 220 is an automated device for delivery and removal of microscope slides to and from the microscope's stage 205a, which positions the slides under the microscope's objectives 205b for magnification. According to one embodiment, slide loader 220 holds up to 50 microscope slides, which can be randomly accessed for delivery to stage 205a. According to one embodiment, slide loader 220 is an SL-50™ Random Access Slide Loader manufactured by Applied Imaging Corporation.

According to one embodiment, computer 230 is a dual processor personal computer having two Intel XEON™ 1.8 gigahertz microprocessors and runs WINDOWS™ XP PROFESSIONAL™ operating system. The computer includes a display 230a, input devices 230b and 230c, and a memory device (not shown). Display, as referred to herein, includes any device capable of displaying digitized images including, but not limited to, a CRT or liquid crystal display. Input device, as referred to herein, includes any device capable of generating computer input including, but not limited to, a mouse, trackball, touchpad, touchscreen, joystick, keyboard, keypad, voice activation and control system, or the like. The memory device includes any memory that is capable of storing and retrieving digital images and includes, but is not limited to, one or a combination of, a hard drive, floppy disk, compact disk (CD), digital videodisk (DVD), ROM, EPROM, EEPROM, DRAM, SRAM, or cache memory. While the forgoing describes equipment and software used in embodiments of the present invention, those of skill in the art will recognize that various substitutes and alternatives may be used in system 200 without deviating from the spirit of the present invention.

The functionality of the specific embodiment is to provide digitized images for display so that a user can examine and manipulate the images. Computing and display technologies are ever evolving, and the invention does not require any specific type or configuration of computer. In addition, while the specific embodiment uses a CCD (charged coupled device) camera to digitize the magnified images of the microscope slides, the invention does not require any specific type of digitizing mechanism. Cameras using other imaging array technology, such as CMOS, could be used, or the magnified slide image could be captured on photographic film, and the photographic film could be scanned in order to digitize the images. Further, as described in U.S. patent application Ser. No. 10/165,770, filed Jun. 6, 2002, and published Jan. 16, 2003 as Published Patent Application No. 2003/0012420 A1 to Nico Peter Verwoerd et al., microscope slides can be digitized using a high-resolution flatbed scanner.

Image Correction and Linking

Figure 3A:
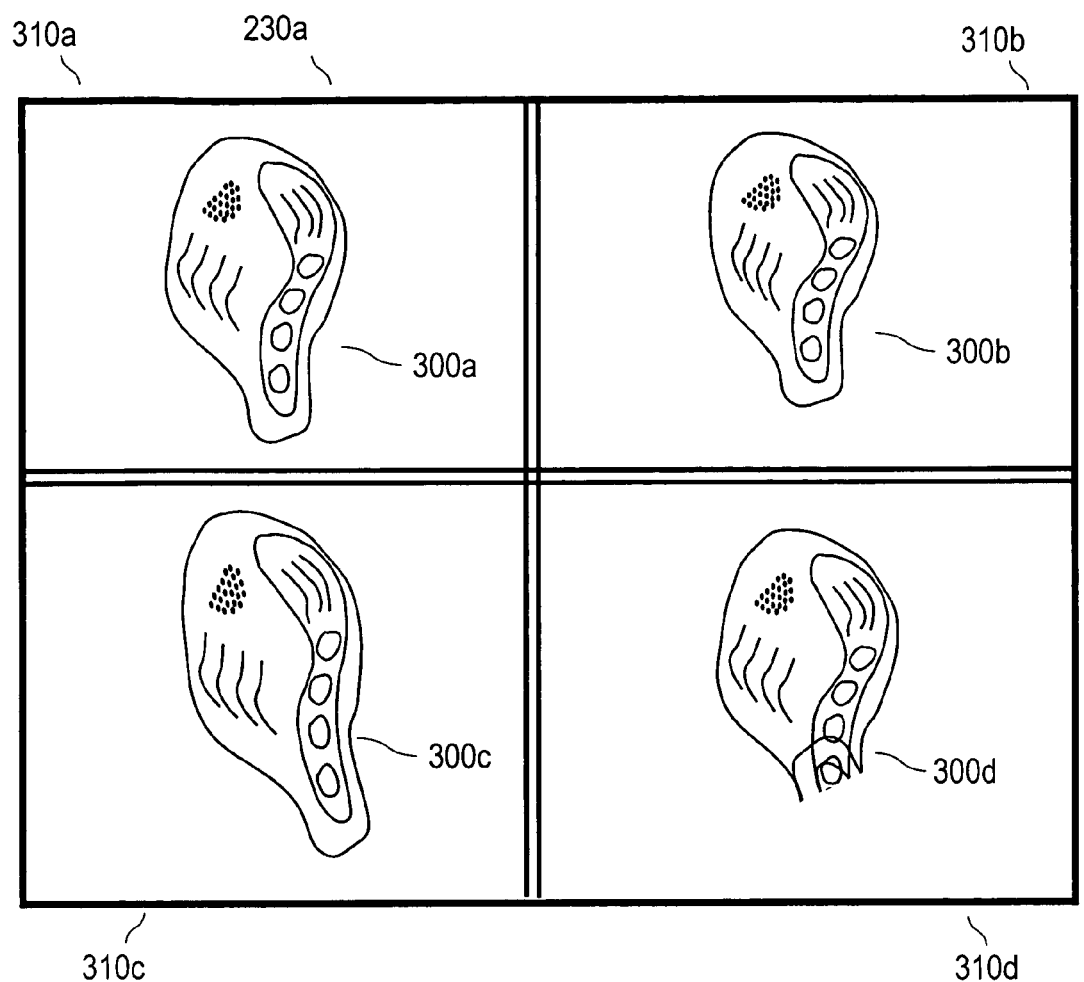
FIG. 3A is a simplified schematic of digitized images displayed on a display and corresponding, respectively, to a set of serial sections.

FIG. 3A is a simplified schematic of digitized images 300a-300d displayed on display 230a and corresponding, respectively, to serial sections 100a-100d. Serial-section images 300a-300d are read from computer memory and displayed in screen windows 310a-310d, respectively. According to one embodiment, two or more of the serial-section images can be linked and locked (linking and locking are explained in detail below) such that graphical manipulation of one serial-section image causes each linked and locked serial-section image to be similarly manipulated. For example, zooming in (i.e., magnifying) on a serial-section image, panning across or rotating the serial-section image, causes respective zooming, panning, or rotation of linked and locked serial-section images. Zoom, pan, rotate or other graphical manipulations of serial-section images 300a-300d are controlled by a user using one or both input devices 230b and 230c. Graphical manipulations may be selected from drop-down menus, context menus, floating menus, graphical user interface (GUI) buttons displayed on display 230a, combinations of mouse clicks, combinations of mouse clicks and keyboard strokes, or other known computer control mechanisms.

Figure 3B:
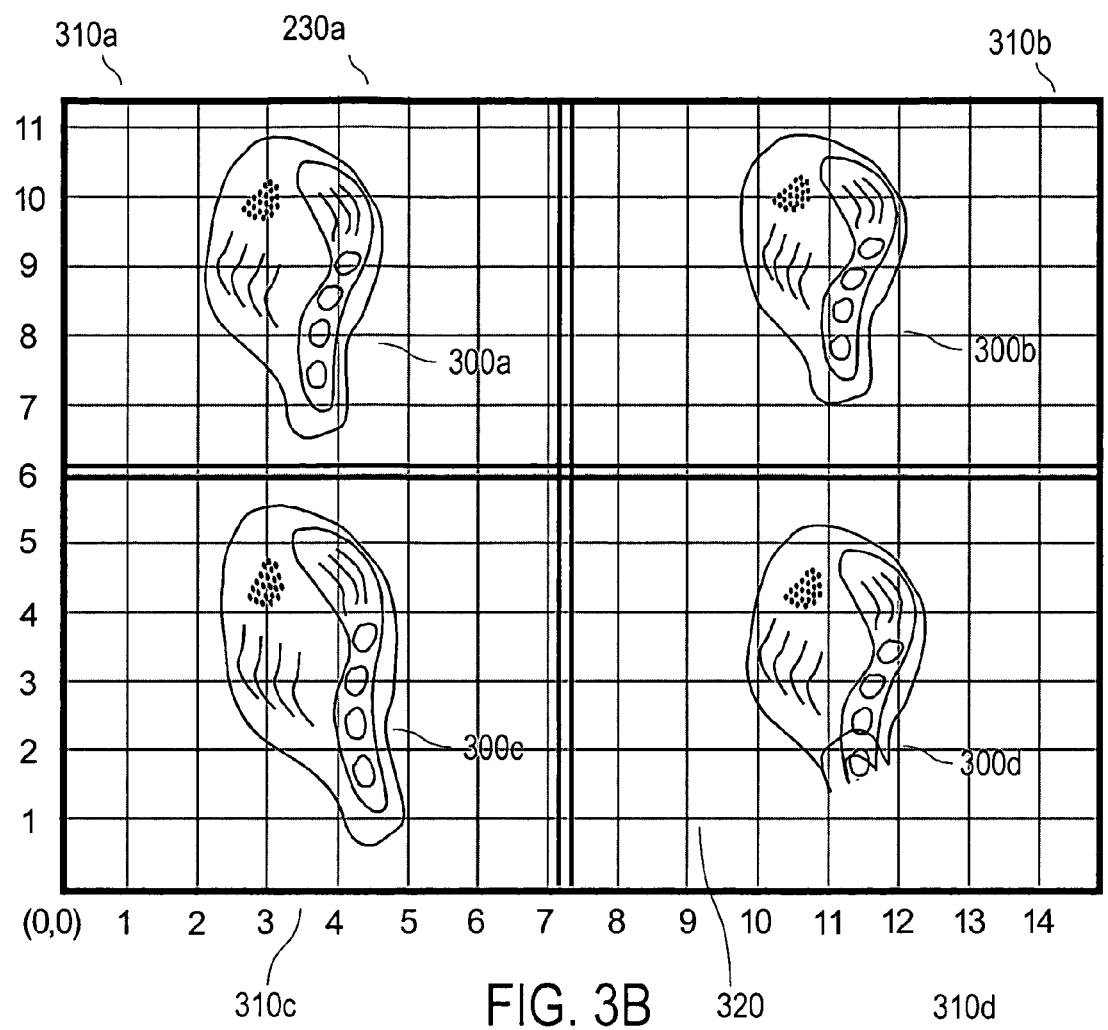
FIG. 3B is a simplified schematic of a coordinate system superimposed over digitized images displayed on a display.

According to one embodiment, serial-section images 300a-300d are mapped to a coordinate system 320, which is shown superimposed over display 230c in FIG. 3B. In mapping serial-section images to coordinate system 320, image data, such as pixel-image data, of the serial-section images are assigned coordinates (e.g., (x,y) or (r,θ) coordinates) relative to their positions on coordinate system 320. Coordinate system 320 is used as a reference system to track the location of serial-section images and their associated image data, such as pixel-image data. Coordinates assigned to the pixel-image data are updated as the serial sections are moved (or "dragged") across display 230a and as the serial sections are morphed to form transformed images (image transformation is discussed below in detail).

While coordinate system 320 is shown is FIG. 3B as an orthographic system (e.g., a Cartesian coordinate system), this is not necessary; coordinate system 320 may be a polar coordinate system or other useful system. Although the origin of coordinate system 320 is shown to be located in the lower left corner of display 230, the origin could be alternately located.

Figure 4A:
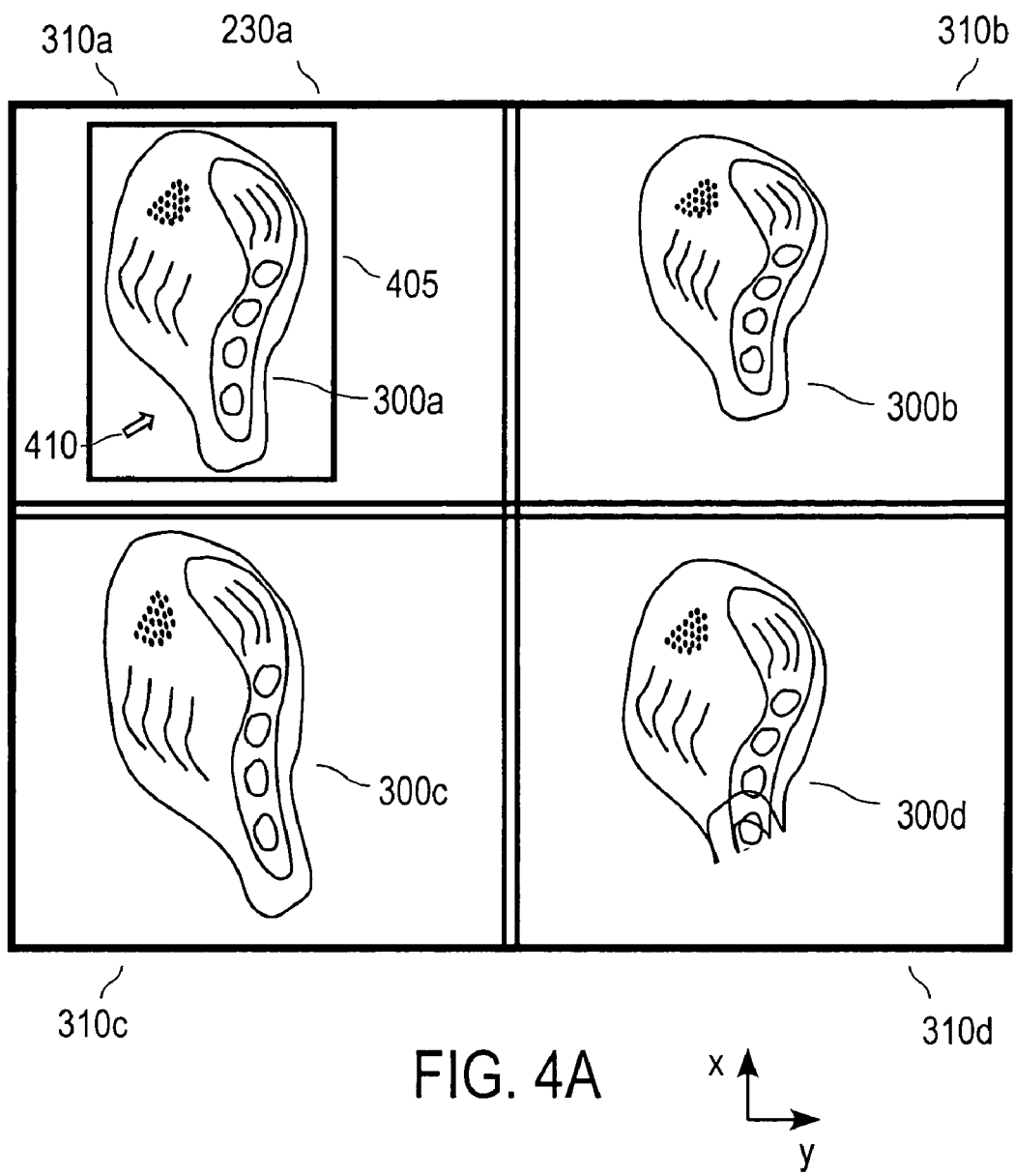
FIG. 4A is a simplified schematic of a set of digitized images of serial sections with a reference-link region overlying one of the digitized images.
Figure 4A:
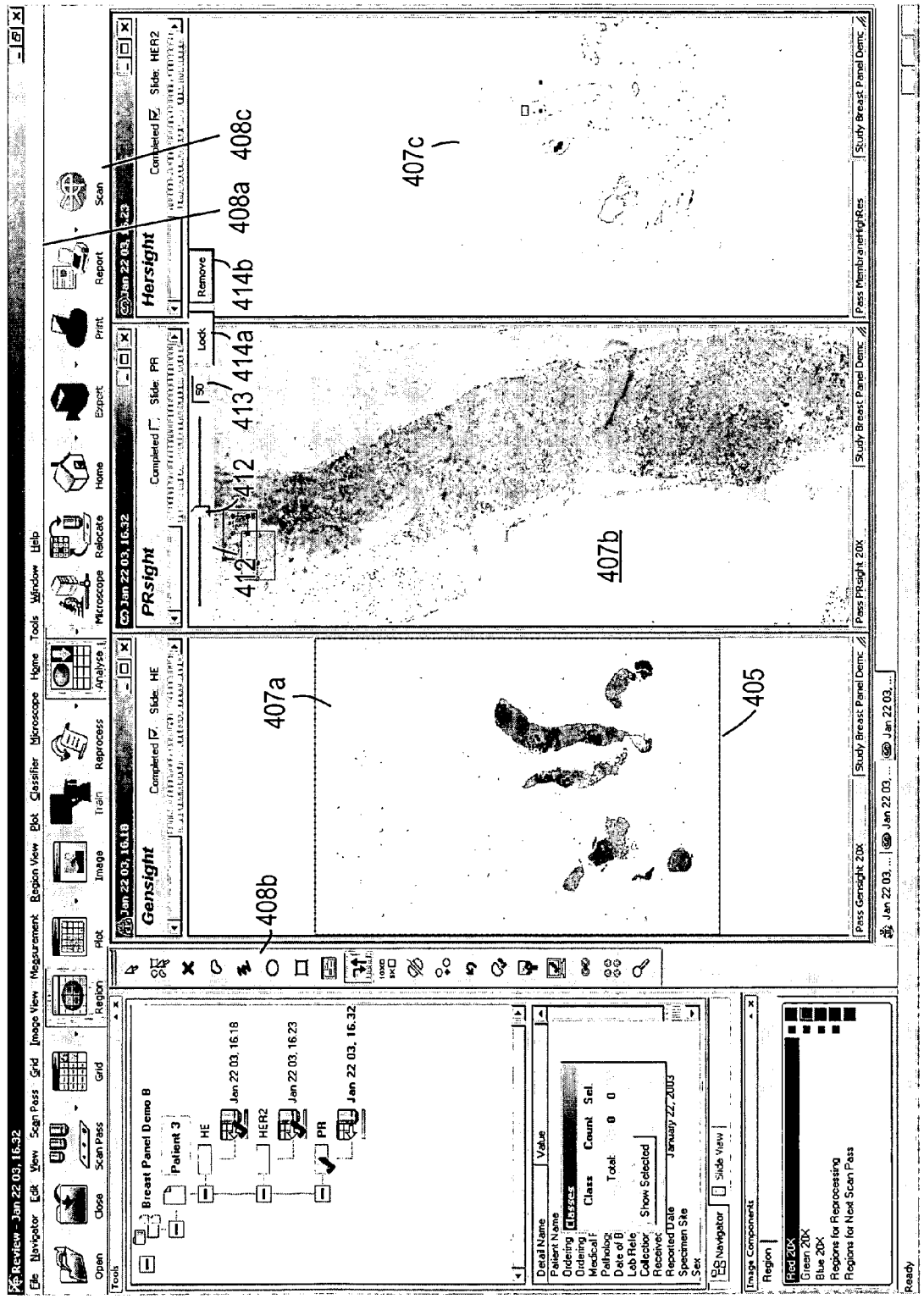
Figure 4A:
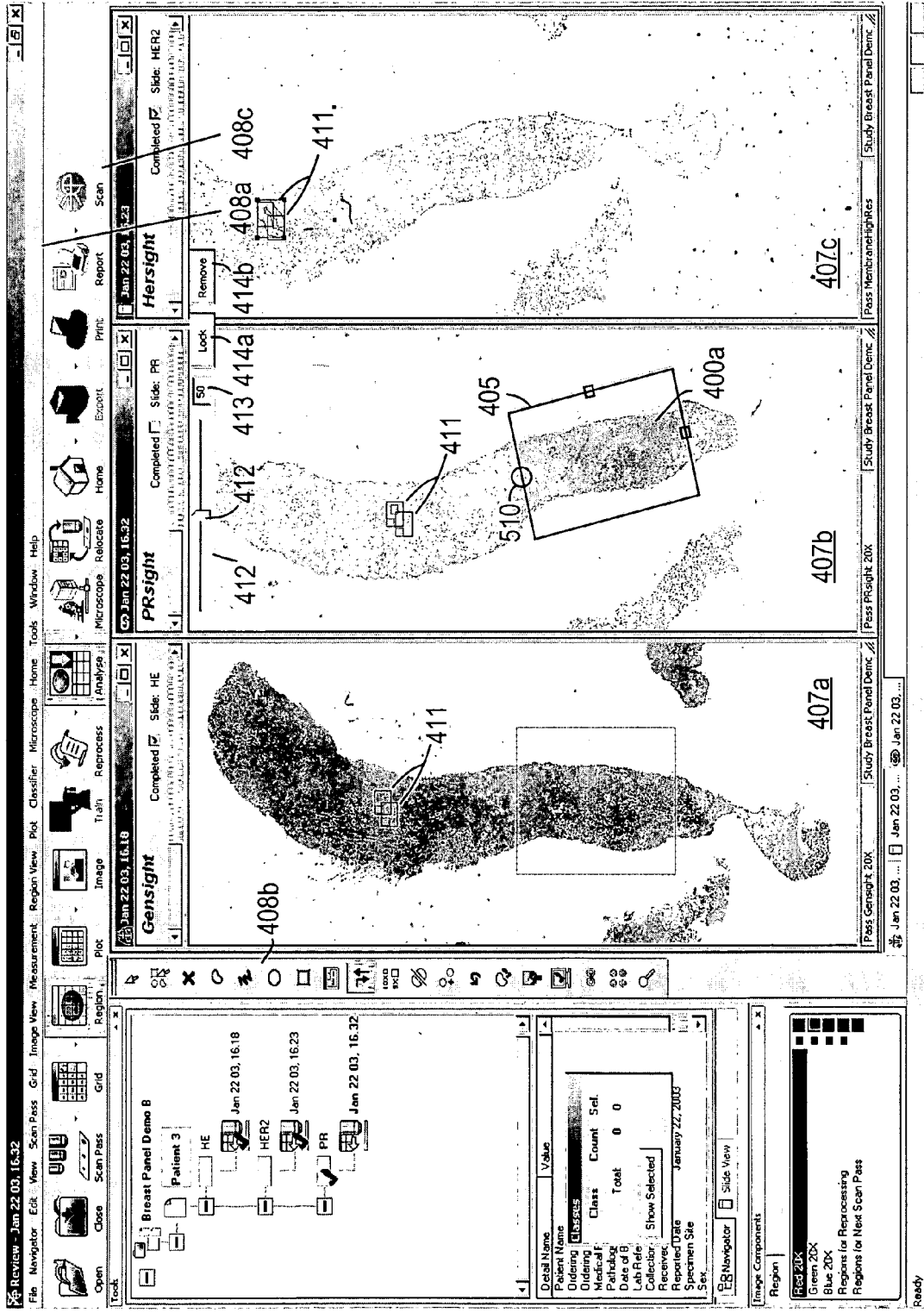
Figure 4B:
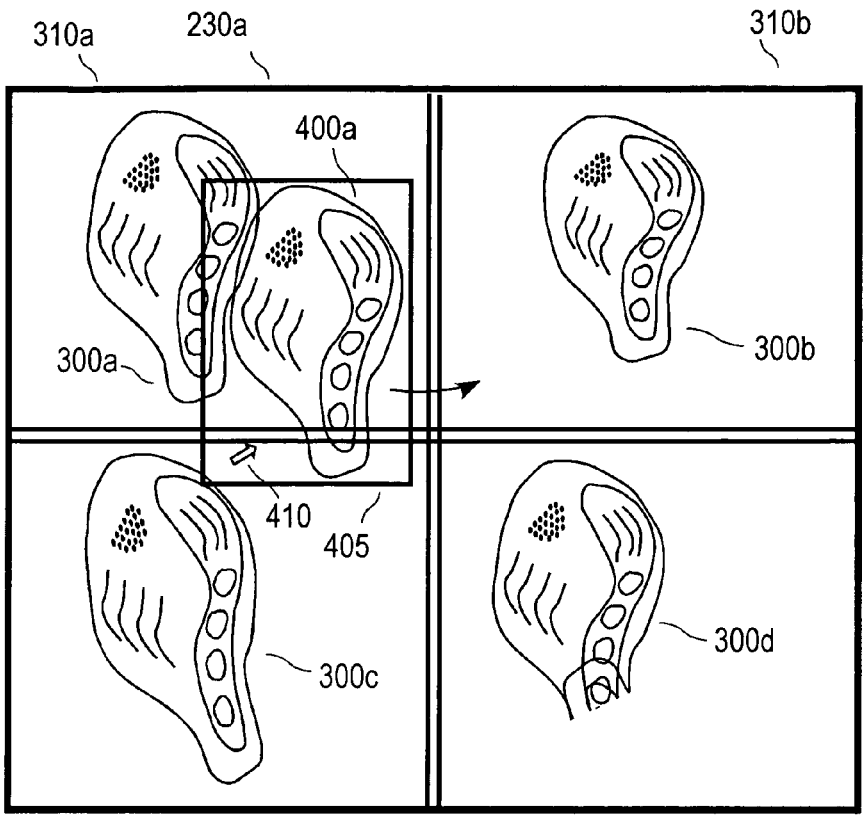
FIGS. 4B-4D show a time ordered sequence of events of dragging a ghost image over another image 300b.
Figure 4C:
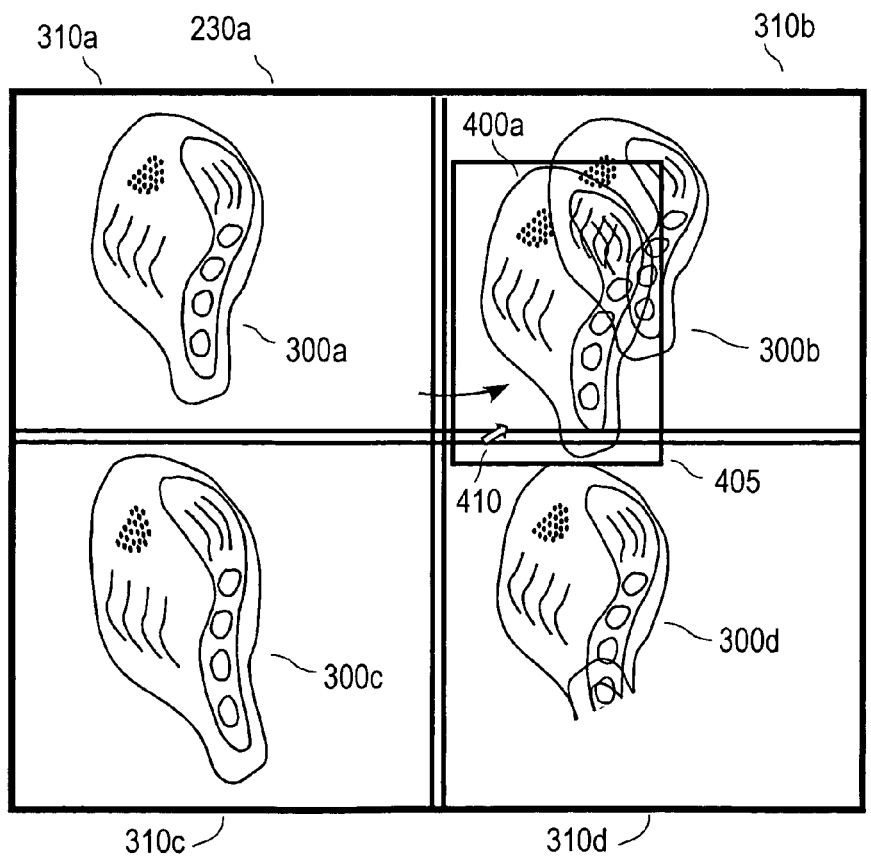
Figure 4D:
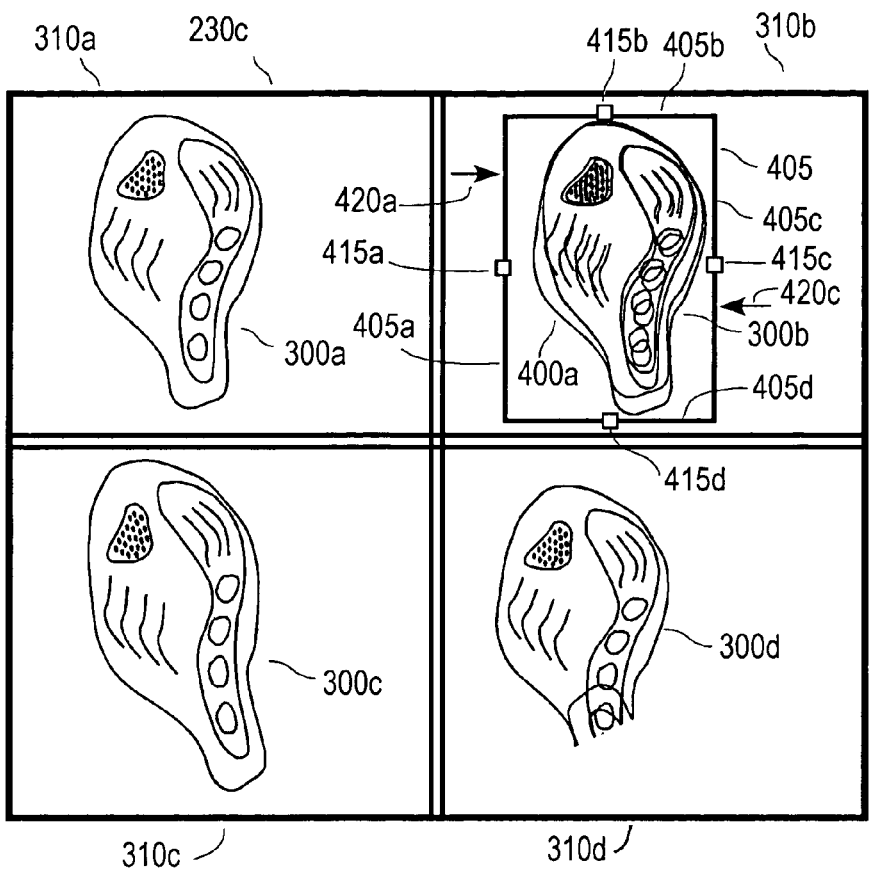

To drag and transform a serial-section image, a reference-link region 405 is positioned over a serial-section image, such as serial-section image 300a, or portion thereof (see FIG. 4A). Positioning reference-link region 405 over a serial-section image or a portion thereof, causes a copy of the image or portion to be created. The copy is referred to herein as a "ghost image." FIGS. 4B-4D show a time ordered sequence of events of dragging a ghost image 400a (a copy of image 300a) "over" image 300b. Ghost image 400a is dragged from screen window 310a (see FIG. 4B) to screen window 310b (see FIG. 4C). The ghost image is then placed "over" image 300b and approximately registered with image 300b (see FIG. 4D). According to an alternative embodiment, rather than positioning a reference-link window to select all or a portion of a serial-section image for generation of a ghost image, an entire serial-section image may be selected for inclusion in a reference-link region and ghost image by selecting an appropriate option displayed on the display, by pressing one or more keys on the keyboard or the like. For example, a GUI button may be displayed on the display for selecting an entire serial-section image for inclusion in a ghost image. FIG. 4A' is a simplified schematic of a GUI 406 that includes three serial-section images 407a-407c, wherein a reference-link region 405 includes the entire serial-section image 407a, which may be selected for inclusion in the reference-link region by pressing a select GUI button in one of the tool bars 408a, 408b, or 408c or by other selection methods.

An image underlying a ghost image is referred to as an "underlying image." According to a particular implementation, a reference-link region is selected for dragging by (i) placing a pointer 410 within the reference-link region, (ii) pressing a control key 230d on input device 230b (e.g., a keyboard), and (iii) pressing a left-positioned button 230e on input device 230c (e.g., a mouse), see FIGS. 4A-4C. The reference-link region and ghost image may subsequently be dragged over an underlying image by appropriately manipulating input device 230c (e.g., dragging a mouse).

According to one embodiment, each serial section, or a portion thereof, is scanned by the microscope at a plurality of magnifications, such as low, medium, and high magnifications, or other magnifications. Low, medium, and high magnifications might include 5×, 10×, and 40× magnifications, respectively, or other magnifications. Each scan provides a serial-section image having an image-data density that corresponds to an associated magnification. Specifically, a low-magnification scan provides low-density-image data, a medium-magnification scan provides medium-density-image data, and a high magnification scan provides high-density-image data. Features of interest in a serial section might be scanned at a relatively high magnification so that these features can be clearly discernable during subsequent analysis. However, as high magnification scanning takes a relatively long time, an entire serial section might not be scanned at high magnification, but may be scanned at lower magnification, which takes relatively less time. According to one embodiment of the present invention, a user may choose to display a serial-section image that includes image data from one or more sets of disparate image-density data. The display of a serial-section image that consists of one or more sets of disparate image-density data may be selected from a drop-down menu, a tool bar, a context menu, a floating menu, by pressing one or more GUI buttons or by other known selection methods. FIG. 4A" is a simplified schematic of GUI 406 that includes the three serial-section images 407a-407c according to one embodiment of the present invention. The portions of the serial-section images that are within bounded regions 411 might include relatively high-density-image data. The portions of the serial-section images that are within bounded regions 411 might also include relatively low-density image data. Additionally, the remaining portions of the serial-section images outside of the bounded regions 411, might include relatively lower-density-image data.

According to another embodiment, a ghost image may be generated from one or more sets of disparate image-density data. Selection of one or more sets of disparate image-density data for inclusion in a ghost image may be made via a drop-down menu, a tool bar, a context menu, a floating menu, by pressing one or more GUI buttons or by other known selection methods. Generating a ghost image that includes one or more sets of available image-density data (e.g., image data from all available scans) provides that the reduction in resolution of the ghost image will be limited as the magnification of the ghost image on the display is increased. According to one embodiment, generating a ghost image from all available image-density data is a default condition.

According to one embodiment, reference-link region 405 is created by a user selecting a create reference-link region option and placing the reference-link region in a desired location over an image. Creation of a reference-link region is selected, for example, from a menu, such as a drop-down menu, a tool bar, a context menu, or a floating menu, or is selected by "pushing" a GUI button or by other known selection methods. The reference-link region is sized and placed over an image or portion of an image by a user using an input device, such as a mouse, to drag and locate the reference-link region as desired.

According to one embodiment, ghost images are transparent images through which an underlying image is visible. Note that structures of serial section 100b shown in image 300b (see FIGS. 4C-4D) are visible through ghost image 400a. Transparency of the ghost image aids in registering the ghost image to the underlying image as the ghost image is dragged over the underlying image. The transparency of the ghost image may be increased or decreased to respectively enhance the visibility of the underlying image or the visibility of the ghost image. A default transparency of the ghost image may be 50%, and the transparency may be adjusted in a substantially continuous manner from 0% transparency to 100% transparency. A transparency of 100% might indicate that the ghost image is completely transparent and not visible, and a transparency of 0% might indicate that the ghost image is not transparent and blocks from view underlying portion of an underlying image. FIG. 4B' is a simplified schematic of screen windows 310a-310d, wherein screen window 310b includes a slider bar 412 (sometimes referred to herein as a fader bar) that is configured to change the transparency of a ghost image. FIGS. 4A' and 4A" show another view of slider bar 412. The slider-bar's slider 412' may be manipulated (e.g., dragged) by a user using control device 230c or the like to change the transparency of ghost image 400a. The slider bar may include an indicator 413 configured to indicate a transparency percentage of the ghost image.

FIG. 4B" is a simplified schematic of the slider bar showing slider 412' moved right of center on the slider bar, such that the ghost image has a transparency of 80%, for example, as indicated by indicator 413. For convenience, the 80% transparent ghost image is shown in phantom in FIG. 4B". Increasing the transparency of the ghost images provide for simplified and relatively accurate registration of the ghost image to an underlying image. For example, registration may be simplified by increasing the transparency of the ghost image if the features of interest in the underlying image are substantially fainter than the corresponding features in the ghost image. In such an instance, the increased transparency of the ghost image allows a user to see the relatively faint features of interest in the underlying image to effect registration of the ghost image and underlying image.

According to one embodiment, the slider bar is displayed if a reference-link region and a ghost image are selected for dragging over an underlying image. The slider bar may be displayed with a lock button 414a and a remove button 414b disposed, for example, at one end of the slider bar. The lock button is configured to lock at a set of links between the ghost image and the underlying image, and the remove button is configured to remove the lock. Linking and locking serial-section images are presently described in further detail.

As a ghost image, such as ghost image 400a, is dragged over an underlying image, such as image 300b, pixel-image data of the images are linked by a set of links (sometimes referred to herein as "data links"). Links are formed for pixel-image data of a ghost image and an underlying image that are assigned the same coordinates on coordinate system 320. Pixel-image data assigned the same coordinates are those data that "overlay" and respectively "underlay" each other subsequent to a ghost image being positioned over an underlying image. Each link in a set of links forms an association between a given pair of overlying and underlying pixel image datum. Links may be data pointers, object links, linked lists or other database links. The links may be stored in a database, such as an object database. Links may be established for all pixel-image data or a subset thereof. According to one embodiment, as the ghost image is linked to the underlying image, the serial-section image, such as image 300a, that is associated with the ghost image is also linked to the underlying image. The serial-section image is linked to the underlying image at the same image locations that the ghost image is linked to the underlying image. Stated alternatively, regions of the serial-section image and the ghost image that "match," (i.e., have the same image features) link to the same regions of the underlying image. Ideally the linked regions of the serial-section image, the ghost image, and the underlying image include the same image features. According to one embodiment, and more specifically, each pixel-image datum of the serial-section image is associated with a corresponding pixel-image datum of the ghost image. And for each pixel-image datum of the ghost image that is linked to a given pixel-image datum of the underlying image, the corresponding pixel-image datum of the serial-section image is linked to the given pixel-image datum of the underlying image.

According to one embodiment, links are locked to prevent the links from being changed as the images are graphically manipulated (e.g., panning, zooming, or rotating). Images are locked, for example, by user using an input device to press a GUI button, select a menu option in a drop-down menu, a tool bar, a context menu, or a floating menu or by other known selection means. According to a particular implementation, a ghost image and an underlying image and/or the serial section associated with the ghost image and the underlying image are locked by double clicking a left positioned button 230e on input device 230c. Locked images can be unlocked, for example, to refine the registration between a ghost image and underlying image, by steps similar to those described above for image locking.

According to one embodiment, the shape of a ghost image is sheared and skewed to correct for physical deformations of the serial sections captured in ghost images and/or underlying images. According to a specific embodiment, shearing and skewing include stretching and/or compressing a ghost image in orthographic directions. Whereas in a broader sense shearing and skewing include morphing in arbitrary directions. A ghost image may be sheared and/or skewed to transform the shape of an imaged serial section, if not to its original pre-sliced and pre-mounted shape, at least to a shape similar to an underlying image. As ghost images are transparent, a user can readily determine regions where the ghost image and underlying image are not registered and then transform the ghost image into a "transformed ghost image" to refine the registration of corresponding structures of the ghost image and underlying image. In shearing and skewing a ghost image, pixel-image data of a transformed ghost image are assigned new (or "transformed") coordinates corresponding to the transformed positions of the ghost image's pixels. Additionally a new (or "transformed") set of links is generated that respectively link overlying and underlying pixel-image data of the transformed ghost image and underlying image.

According to one embodiment, a ghost image is sheared and/or skewed by manipulating handles positioned on a reference-link region. FIG. 4D shows a set of handles 415a-415d positioned respectively on sides 405a-405d of reference-link region 405. Handles 415a-415d can be manipulated by a user to orthographically stretch and/or compress ghost image 400a along the x- and y-axes, which are arbitrarily shown as extending vertically and horizontally, respectively. For convenience, reference to axes or planes, such as the x-axis, y-axis, or x-y-plane, includes all axes parallel to these axes and all planes parallel to these planes.

Figure 4E:
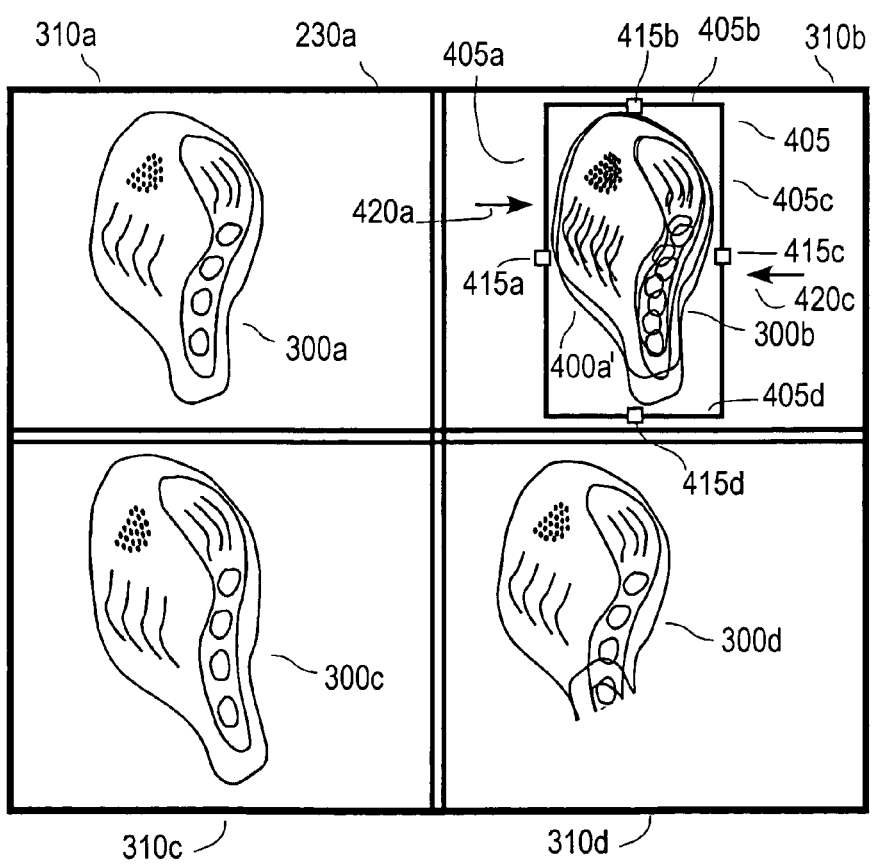
FIGS. 4E-4G show a time ordered sequence of events of the compression of ghost image to refine the registration between the ghost image and an underlying image.
Figure 4F:
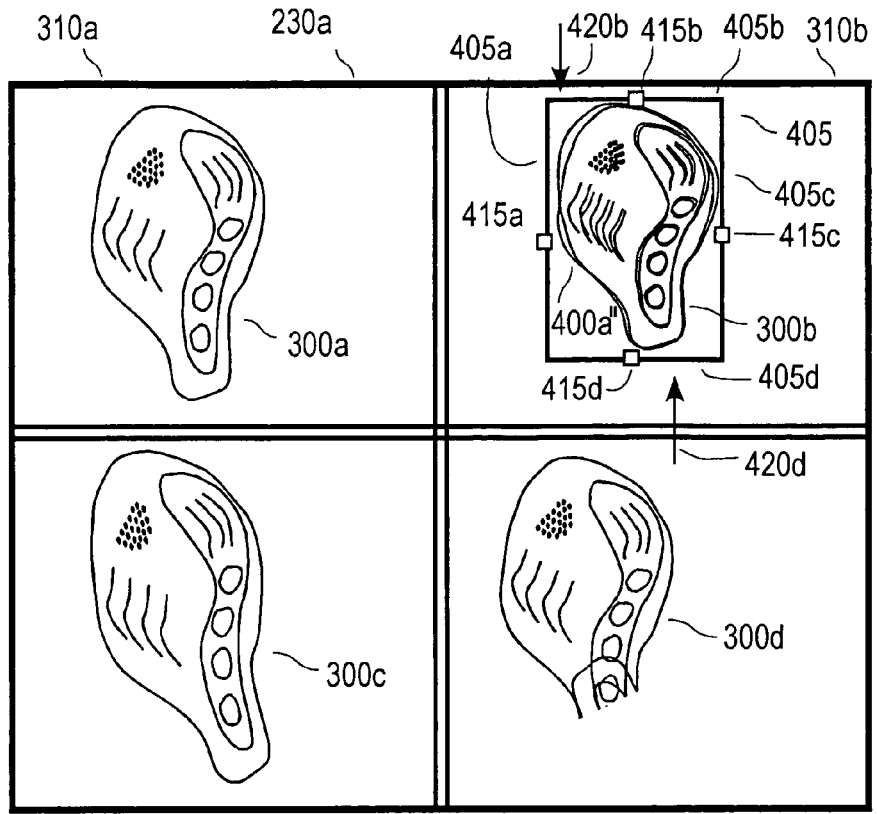
Figure 4G:
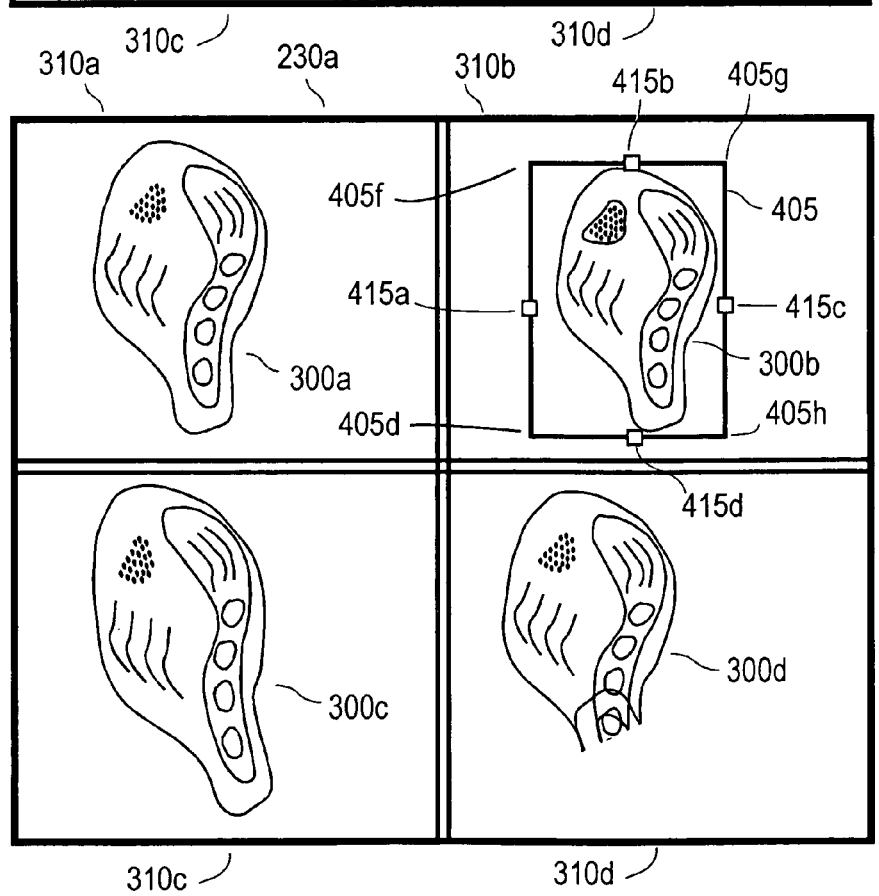

FIGS. 4D-4E show a time ordered sequence of events of first compressing ghost image 400a along the y-axis to form a transformed ghost image 400a', and FIGS. 4F-4G show a time ordered sequence of event of compressing the ghost image along the x-axis to form a transformed ghost image 400a". In compressing ghost image 400a along the y- and x-axes, the registration of ghost image 400a and underlying image 300b is refined to simplify cross comparisons of the serial-section images. To compress ghost image 400a along the y-axis and form transformed ghost image 400a', handles 415a and/or 415c are moved inward as indicated by arrows 420a and 420c. This manipulation refines the registration of the ghost image and underlying image along to the y-axis. To compress transformed ghost image 400a' along the x-axis and form transformed ghost image 400a", handles 415b and/or 415d may be moved inward as indicated by arrows 420b and 420d. This manipulation of handles 415b and/or 415d refines the registration of transformed ghost image 400a" and underlying image 300b along the x-axis.

Figure 4H:
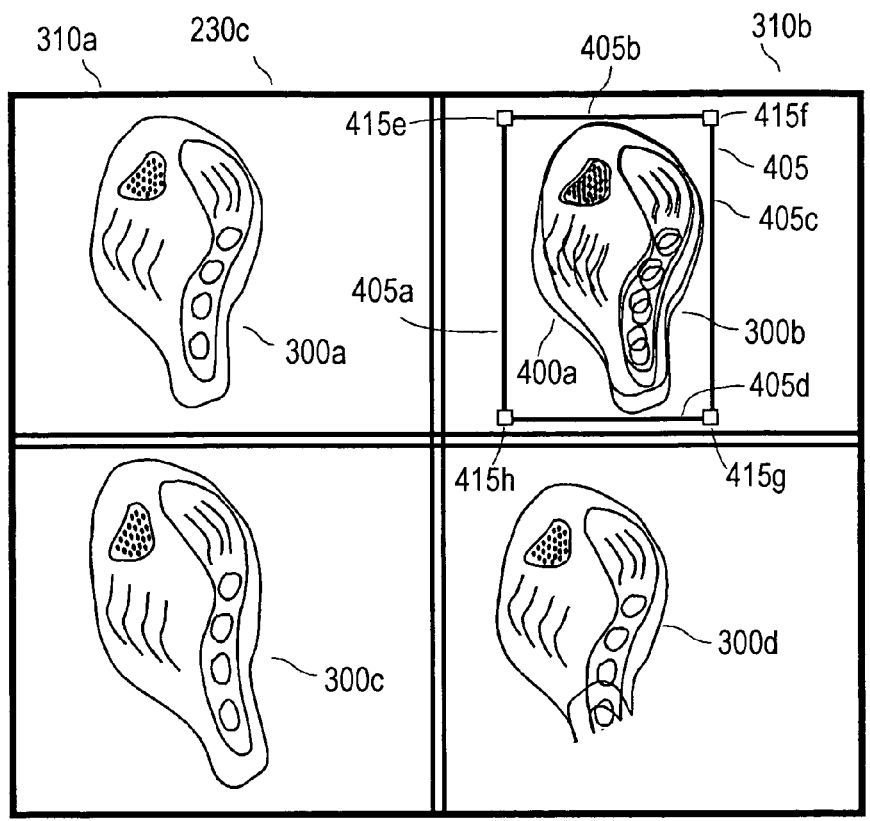
FIG. 4H shows a reference-link region having handles positioned on corners of the region.

According to one embodiment of the present invention, reference-link region 405 and ghost image 400a may be simultaneously stretched and/or compressed along both the y- and x-axes by manipulating one of handles 415e-415h positioned on the corners of reference-link region 405, see FIG. 4H.

Figure 4I:
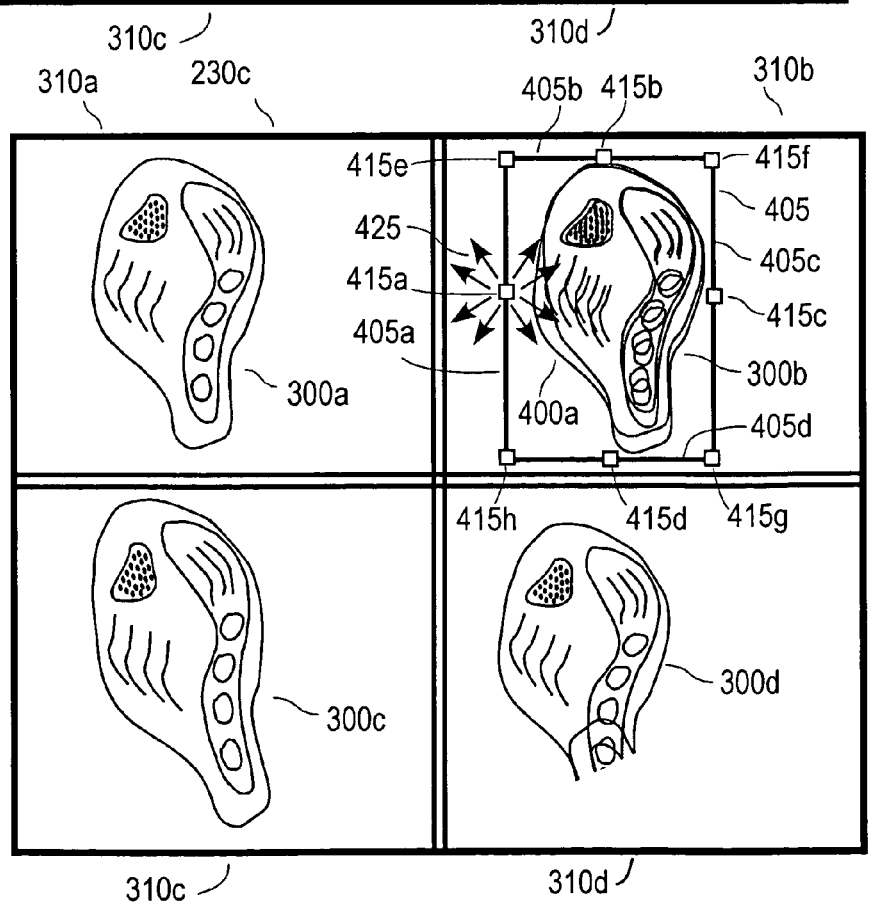
FIG. 4I shows a reference-link region having handles positioned on the corners and sides of the region.
Figure 4J:
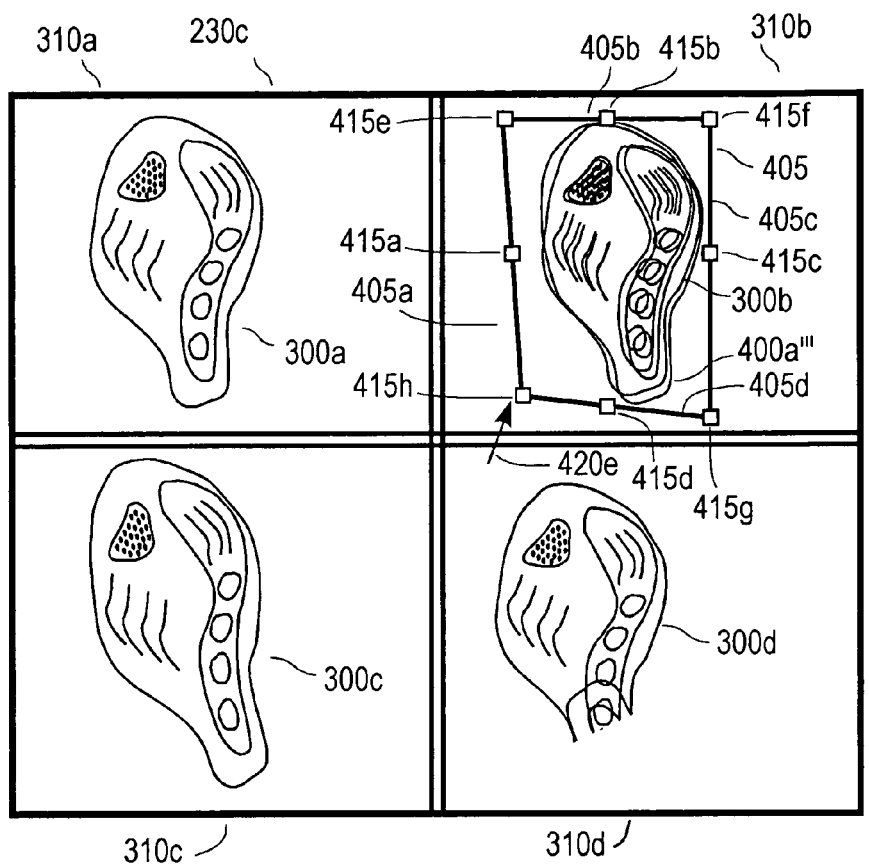
FIGS. 4J-4K show a time ordered sequence of events of shearing and skewing a ghost image.
Figure 4K:
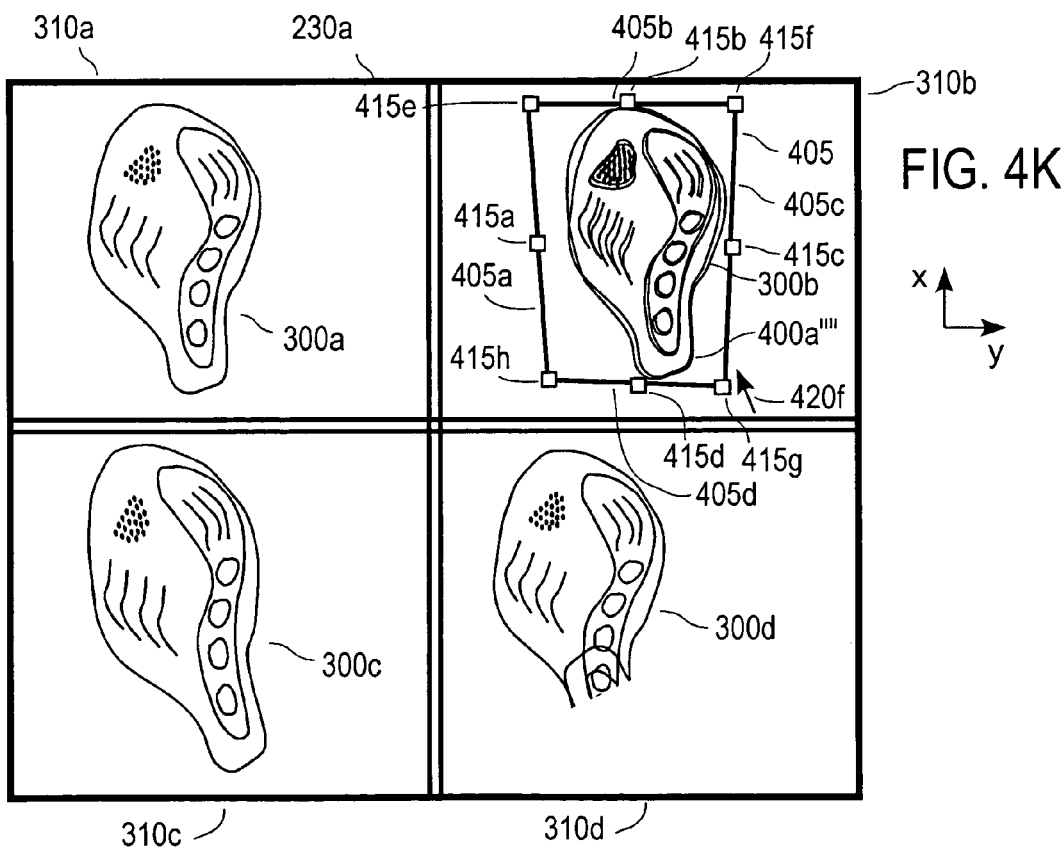
Figure 5A:
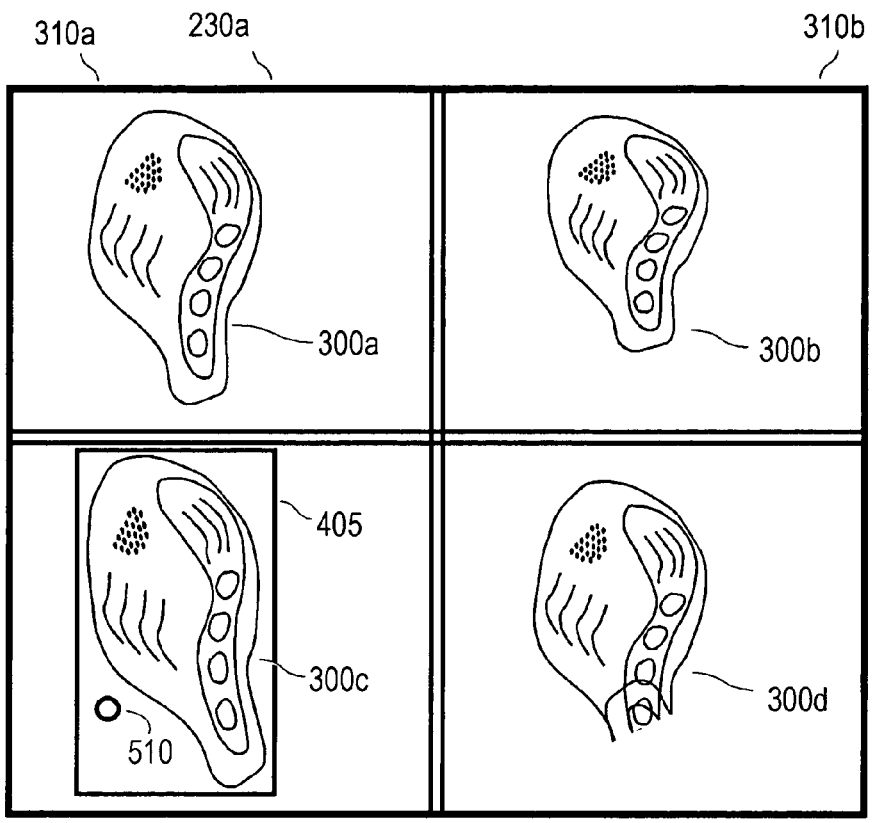
FIGS. 5A-5D show a time ordered sequence of events of the rotation and compression of a ghost image to register the ghost image to the underlying image.
Figure 5B:
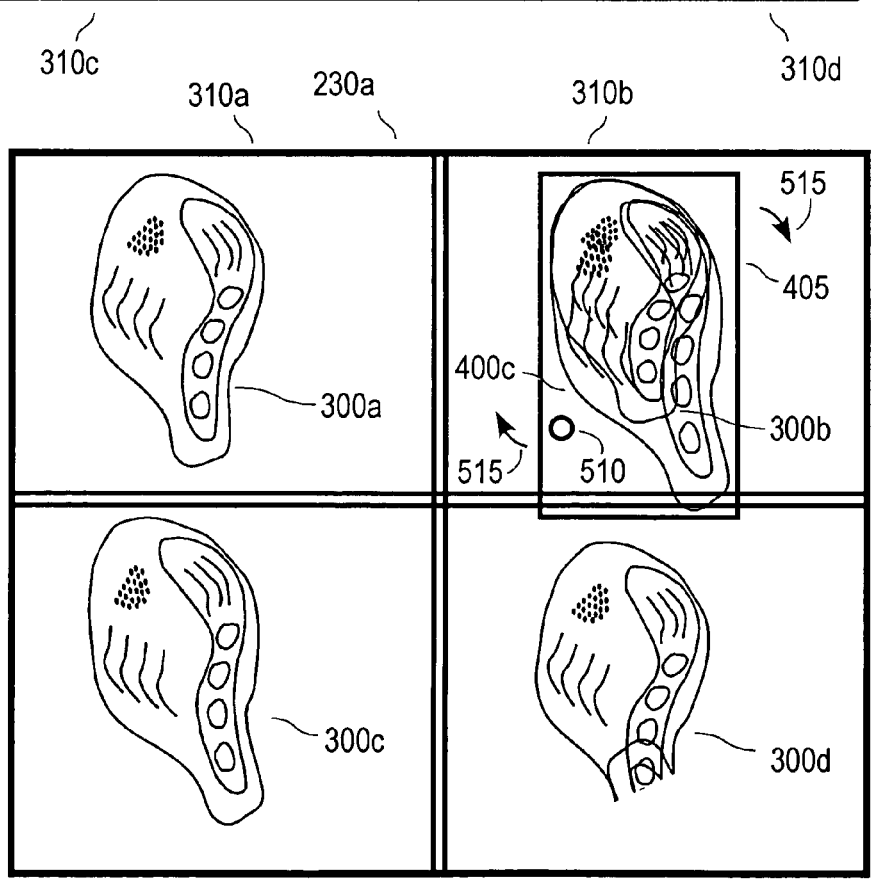
Figure 5C:
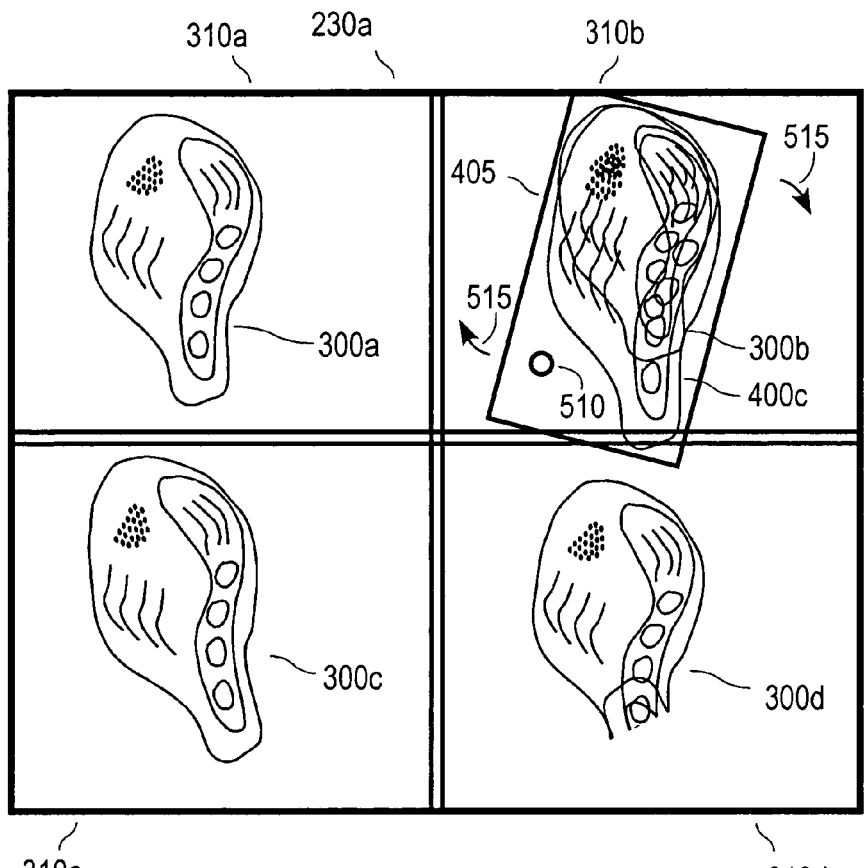
Figure 5D:
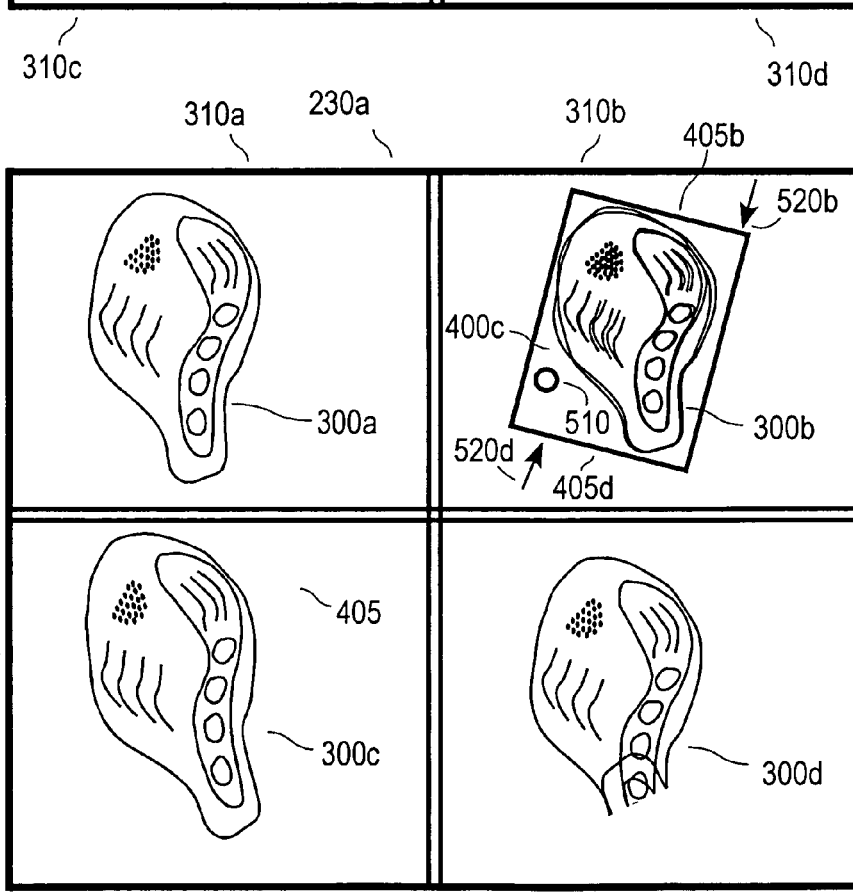

According to another embodiment, handles 415a-415h are used more generally to shear and skew reference-link region 405 and ghost image 400a. To more generally shear and skew ghost image 400a, handles 415a-415h are not constrained to move orthographically as discussed in the preceding example, but can be moved arbitrarily in nearly any direction in the x-y plane. FIG. 4I shows a set of arrows 425 indicating a few of the arbitrary directions in which handle 415a can be moved. Each of handles 415b-415h can be similarly moved in the directions indicated by arrows 425, as well as numerous other directions. FIGS. 4J-4K show a time ordered sequence of events of handles 415h and 415g being moved in directions indicated by arrows 420e and 420f, respectively, to form transformed images 400a''' and 400a'''' and to refine the registration of these transformed ghost images with underlying image 300a.

In the foregoing embodiments reference-link regions have been shown to be four sided regions (often rectangular) having four or eight handles located on the sides and/or corners of the reference-link regions. Embodiments of the present invention are not limited to having four sides with handles located on the sides and corners of a reference-link region. Reference-link regions, according to embodiments of the present invention, may have nearly any arbitrary shape with handles arbitrarily located on the reference-link regions to affect a wide variety of topological morphs. The handles can be constrained to move in set directions or can be unconstrained to move in arbitrary directions. While some of the above examples have discussed sets of handles constrained to move orthographically, handles can be constrained to move in set directions or at nearly any other angle between 0° and 360°. For example, a pentagonal reference-link region may have handles constrained to move at 72° with respect to nearest neighbor handles.

According to one embodiment, handles, such as handles 415a-415h, are moved by a user using input device 230c to select and drag the handles. According to an alternate embodiment, handles are moved by a user using input device 230b to enter handle coordinates. Those of skill in the art will no doubt know of other useful tools and methods to move handles positioned on a reference-link region.

According to another embodiment of the present invention, reference-link regions are rotated to register ghost images to underlying images. FIGS. 5A-5D show a time ordered sequence of events of rotating ghost image 400c, corresponding to digital image 300c, to register the ghost image to underlying image 300b. According to a specific implementation, a GUI button 510 is pressed and held using input device 230c (e.g., a mouse), as the input device is used to drag the GUI button causing the reference-link region to rotate (indicated by arrows 515). According to another embodiment, the GUI button may be pressed and held to effect rotation of the ghost image and the reference-link region. Rotation may be halted by releasing the GUI button. For example, with a cursor positioned on the GUI button, a left mouse button may be pressed and held to effect rotation to the left, and a right mouse button may be pressed and held to effect rotations to the right. According to another embodiment, input device 230b (e.g., a keyboard) is used to enter commands to rotate the reference-link region. Subsequent to rotation, ghost image 400c is shown to be compressed, as indicated by arrows 520b and 520d, to further refine the registration of the ghost image and underlying image. The reference-link region may be configured to rotate about its center (e.g., as a default), or another rotation center may be selected. FIG. 4A'' shows GUI button 510 disposed at the top of the reference-link region 405 according to another embodiment of the present invention. While GUI button 510 is shown at the top of the reference-link region in FIG. 4A'' and within a reference-link region in FIGS. 5B-5C, GUI button 510 may be disposed in other useful locations, such as in a toolbar or the like.

According to another embodiment of the present invention, reference-link regions may be sheared and skewed according to weighted shear and skew distributions, respectively. That is, given portions of a ghost image are sheared or skewed by a greater amount than other portions of the ghost image. For example, portions of a ghost image nearest a handle are sheared or skewed by a greater amount than portions of the ghost image farther from the handle. For purposes of convenience, the following discussion describes a technique for a special case of a weighted shearing and skewing distribution, namely a weighted stretching and compressing distribution. The following technique is applicable, however, to shearing and skewing in a more general sense.

Figure 6:
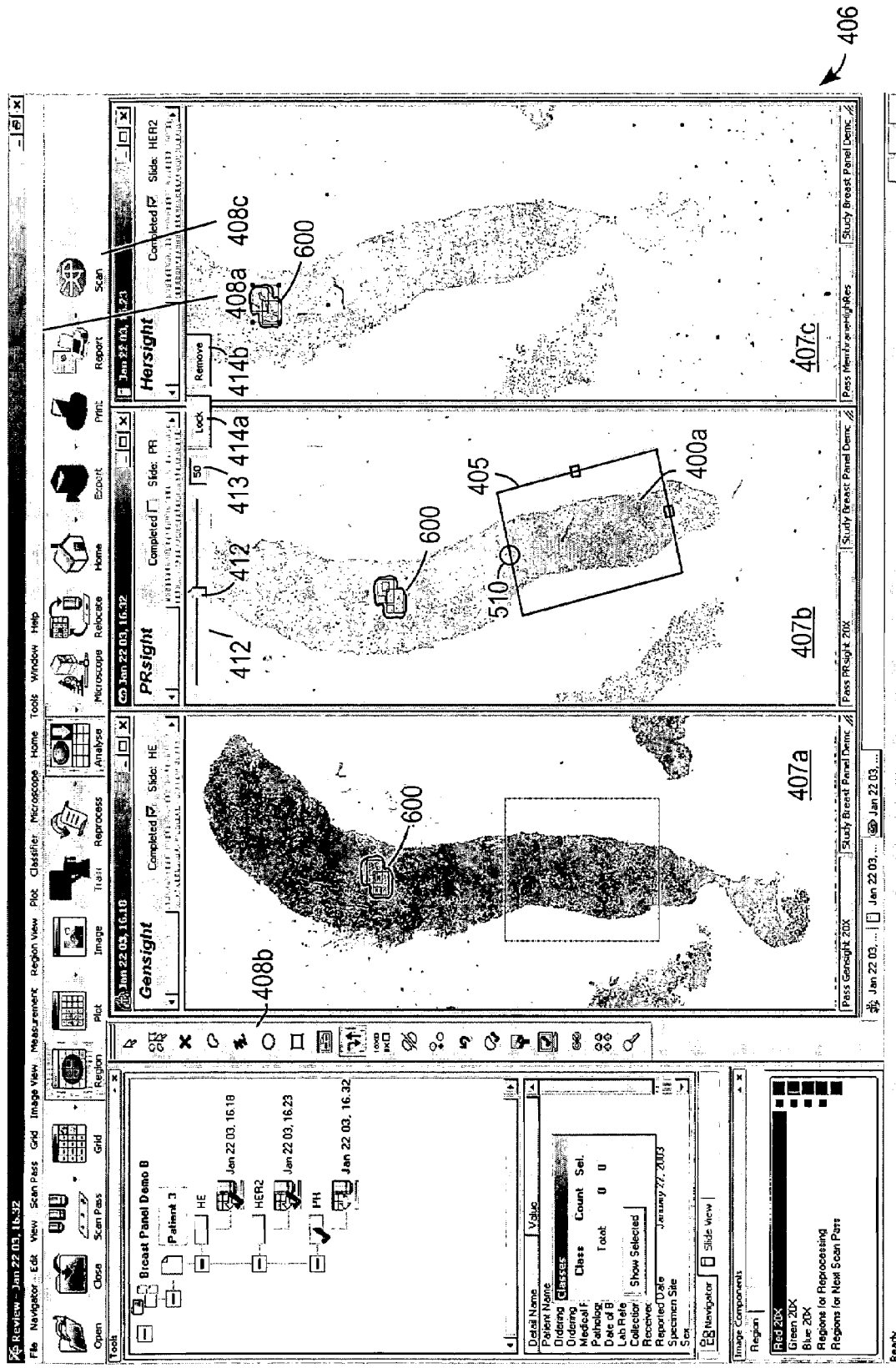
FIG. 6 is simplified diagram of the three serial-section images having respectively corresponding analysis boundaries drawn thereon.
Figure 7:
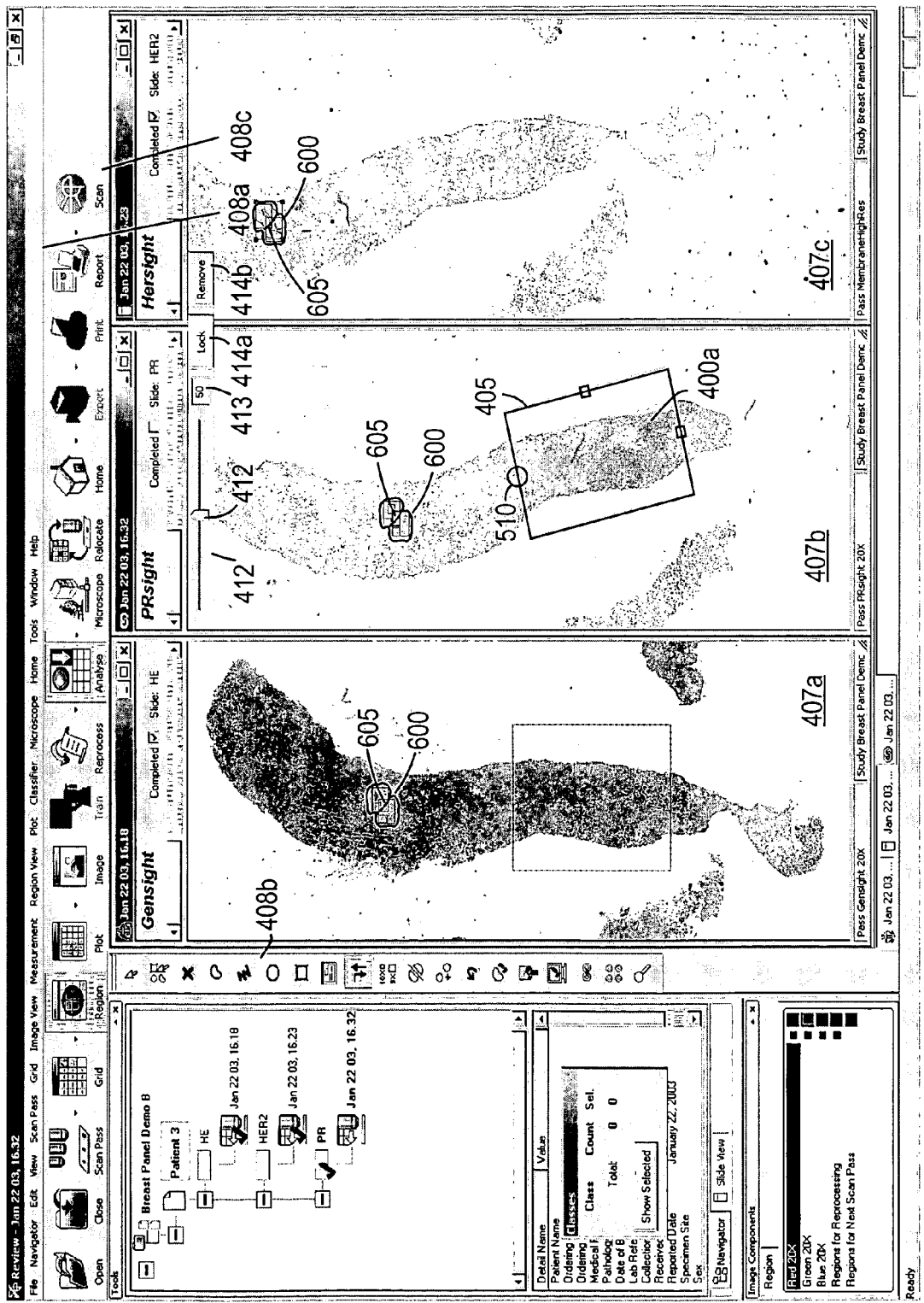
FIG. 7 shows the analysis boundaries split by lines, wherein at least one of the lines is drawn by a user and the other lines correspond to the line drawn by the user and are automatically drawn by the computer.

According to another embodiment of the present invention, an analysis boundary may be drawn by a user in a first serial section that is configured to be automatically drawn in one or more serial sections that are linked to the first serial-section image. FIG. 6 is simplified diagram of the three serial-section images 407a-407c that might be linked to one another. FIG. 6 shows an analysis region 600 that has been drawn over a select region of the first serial-section image 407a. The analysis boundary is automatically drawn by the computer in the other two serial-section images 407b and 407c. According to one embodiment, subsequent to a user drawing the analysis boundary in the first serial-section image, and the computer automatically drawing analogous analysis boundaries in one or more linked serial-section images, analysis of the portions of the serial-section images within the analysis boundaries is automatically performed by the computer. That is, analysis of the portions of the serial-section image within the analysis boundaries is performed without further user input. An analysis boundary may be drawn in one of the serial-section images by a user selecting an appropriate option on one or more of the tool bars or the like, and thereafter using a control device, such as a mouse, to drag a cursor to draw the analysis boundary onto the serial-section image. Subsequent to drawing an analysis boundary on a serial-section image, the analysis boundaries may be further subdivided (or split) to further refine a portion of the serial-section image to be analyzed. FIG. 7 shows analysis boundary 600 split by a line 605 that may be drawn by a user using, for example, the one of the foregoing described techniques. Line 605 may be automatically copied by the computer to one or more linked serial-section images as shown in FIG. 7. User defined analysis boundaries provide that a user can perform analysis on features of interest that may be clearly outlined while not performing analysis on features that are of relatively lesser interest that lie outside the analysis boundaries.

Figure 8:
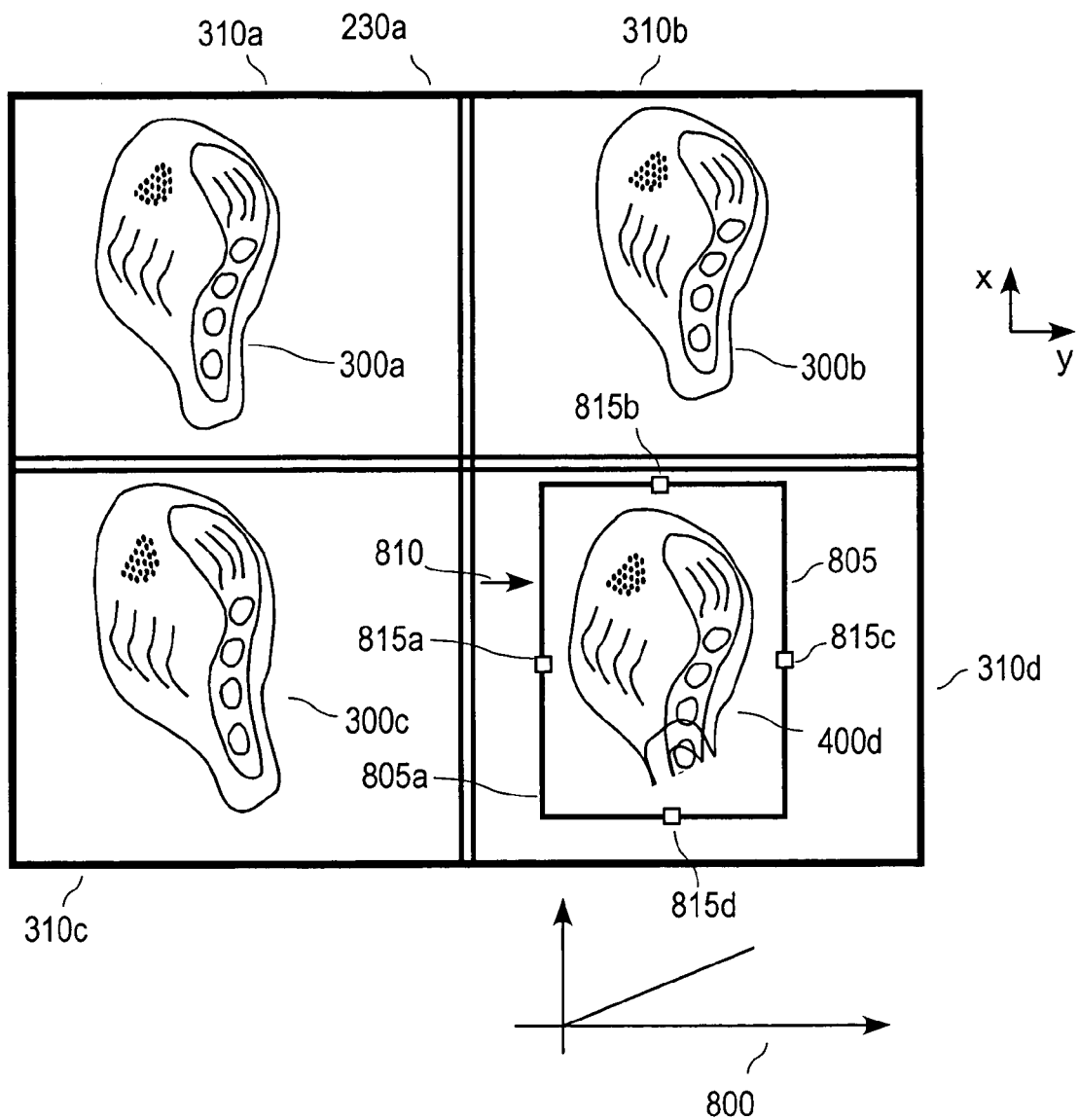
FIG. 8 shows a graph approximately aligned with a reference-link region surrounding a ghost image to indicate weighted compression and stretching of the reference-link region.

FIG. 8 shows a graph 800 approximately aligned with reference-link region 805 surrounding ghost image 400d. Graph 800 is used as a visual aid to indicate portions of ghost image 400d stretched or compressed by a greater or lesser amount than other portions. The increasing value of graph 800 from left to right indicates the increase stretch or compression of the ghost image from side 805a to side 805c, for example, as handle 815c is moved in the direction of arrow 810. Weighted compression and stretch of serial-section images need not linearly change, as indicated by the approximately linearly changing value of graph 800, but can have a variety of weighted stretch and compression profiles, such as parabolic, cubic or other profile. Weighted compression and stretch can thus be adjusted to match the approximate physical properties affecting actual compression and stretch, such as tissue sample density, water content, temperature, and the like.

Figure 9:
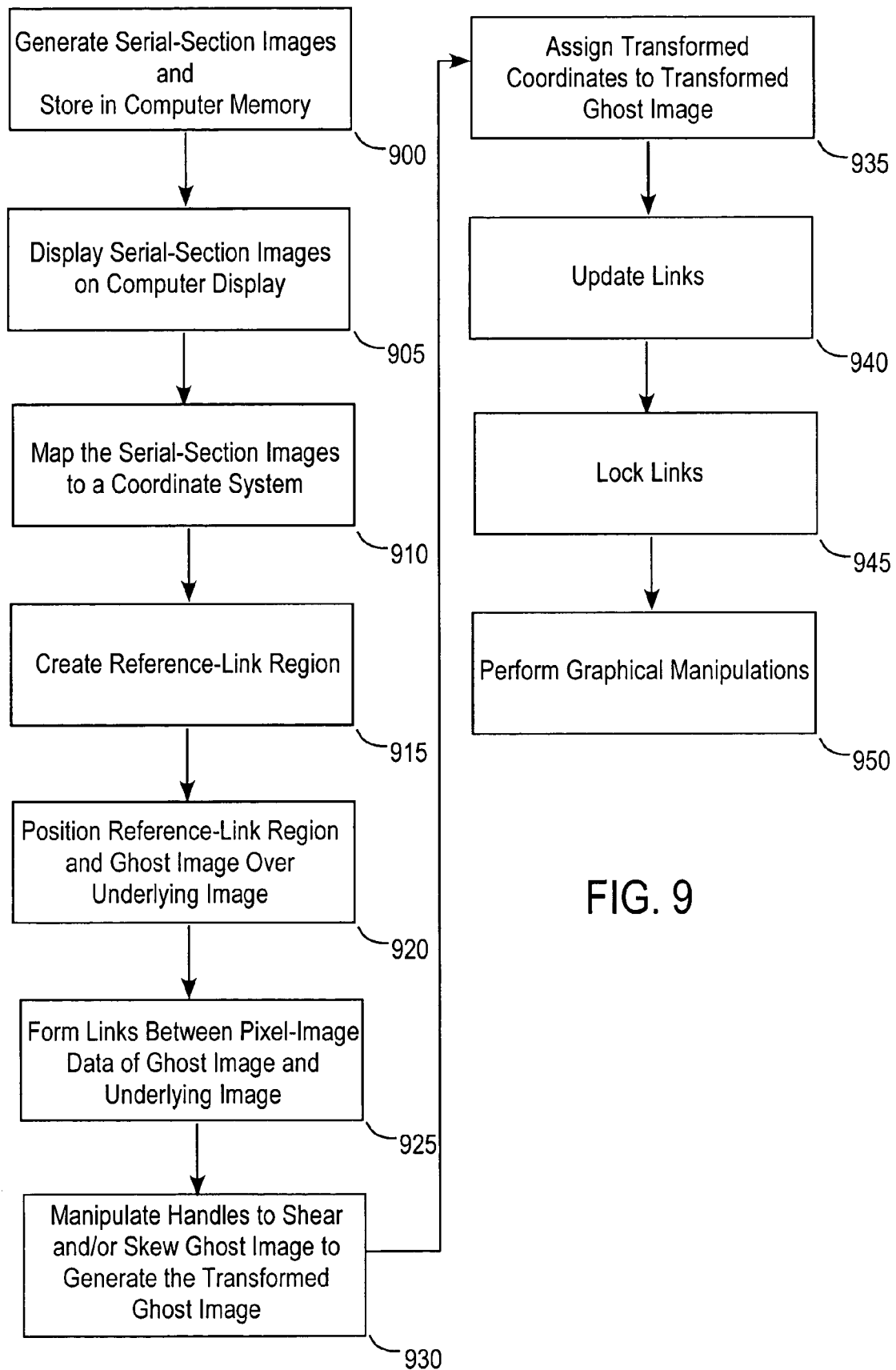
FIG. 9 is a high-level flow chart having steps for registering disparately shaped serial-section images according to one embodiment of the present invention.

FIG. 9 is a high-level flow chart having steps for registering, linking, and locking a set of serial-section images. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. According to an initial step 900, a set of serial-section images is generated and stored in a computer. The serial-section images may be generated, for example, by capturing images of serial sections with a digital camera (e.g., CDD or CMOS camera) mounted on a microscope. The serial-section images may also be generated by scanning the serial sections using a flat bed scanner. In a subsequent step 905, the serial-section images are read from a computer memory and displayed in a window or in a set of windows on a computer display, which is controlled by the computer. The displayed serial-section images are mapped to a coordinate system to track the positions, orientations, and shapes of the serial-section images, step 910. In the mapping step, pixel-image data of the serial-section images are assigned coordinates relative to their position on the coordinate system. Subsequent to displaying the serial-section images, a reference-link region is created and positioned over at least one of the serial-section images or a portion thereof, step 915. Positioning the reference-link region over a serial-section image or portion thereof causes a ghost image to be generated. In a step 920, the reference-link region and ghost image are positioned to overlay an underlying image. The reference-link region and ghost image may be positioned over the underlying image, for example, by dragging the region and image using a computer input device, such as a mouse. Positioning the ghost image over the underlying image causes pixel-image data of the two images to be linked, step 925. Links may be in the form of data pointers, object links, or other database links, which are stored in a database, such as an object database. According to one embodiment, handles are positioned on the reference-link region and are manipulated by a user to shear and/or skew the ghost-image to form a transformed ghost image, step 930. Shearing and skewing serve to refine the registration of the ghost image and the underlying image. As the ghost image is transformed to form the transformed ghost image, new (or "transformed") coordinates are assigned to the pixel-image data of the transformed ghost image, step 935. The reference-link region and ghost image may optionally be rotated to adjust for relative rotations between the ghost-image and underlying image. Similar to shearing and skewing, as the ghost image is rotated, new coordinates are assigned to the pixel-image data of the rotated ghost image. In addition to assigning new coordinates to a transformed and/or rotated ghost image, the links between the pixel-image data of the transformed and/or rotated ghost image and underlying image are updated, step 940. Subsequent to updating the links, the links are locked, step 945. Locking the links prevents the links from being inadvertently changed as the transformed ghost image and underlying image are graphically manipulated. Either the transformed ghost image or underlying image can be graphically manipulated, such as by magnifying, panning, or rotating the images. Graphical manipulation of either the transformed ghost image or the underlying image causes the other image to be similarly graphically manipulated, step 950.

Figure 10:
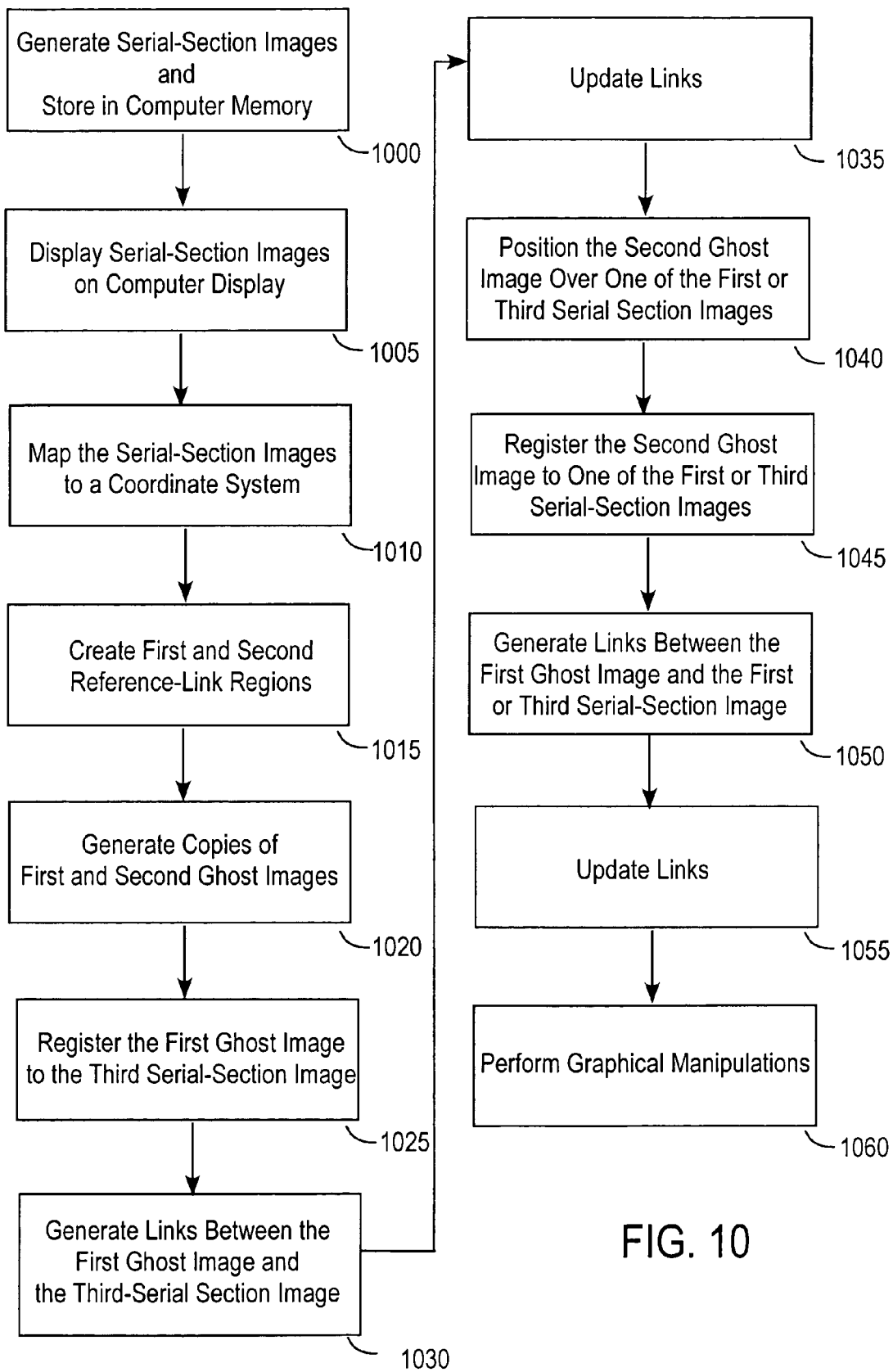
FIG. 10 is a high-level flow chart having steps for registering disparately shaped serial-section images according to another embodiment of the present invention.

FIG. 10 is a high-level flow chart having steps for registering, linking, and locking a set of three serial-section images. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. For convenience, the three serial-section images are referred to as first, second, and third serial-section images. According to an initial step 1000, the serial-section images are generated and stored in a computer. In a subsequent step 1005, the serial-section images are read from a computer memory and displayed in a window or in a set of windows on a computer display, which is controlled by the computer. Either prior or subsequent to displaying the serial-section images, pixel-image data of the images are mapped to a coordinate system, step 1010. Subsequently, first and second reference-link regions are created and positioned respectively over the first and second serial-section images, step 1015. Copies of the first and second serial-section images are generated, which are referred to as the first and second ghost images, respectively, step 1020. The first ghost image is positioned over the third serial-section image, and handles on the first reference-link region are manipulated to shear, skew, and/or rotate the first ghost image to approximately register the first ghost image with the third serial-section image, step 1025. A first set of links is established between the first ghost image and the third serial-section image, step 1030. The links are updated as the first ghost image is sheared, skewed, and/or rotated, step 1035. The second ghost image is optionally positioned over the first serial-section image or the third serial-section image, step 1040. Depending on which of the first and third serial-section images underlies the second ghost image, the second ghost image is sheared, skewed and/or rotated to approximately register the second ghost image to the first or third serial-section image, step 1045. Again, depending on which of the first and third serial-section images underlies the second ghost image, a set of links is established between the second ghost image and the first or third serial-section image, step 1050. The links are locked subsequent to approximate registration of the images, step 1055. The links between the first serial-section image and the third serial-section image and the links between the second serial-section image and the first or third serial-section images cause two of the serial-section images to be graphically manipulated similarly to graphical manipulation of the other serial-section image, step 1060. For example, if a user magnifies, pans, or rotates one of the three serial-section images, the other two serial-section images will similarly be magnified, panned, or rotated. While the forgoing describes a set of steps for registering, linking, and locking three serial-section images, the above steps may be repeated to register, link, and lock nearly any number of serial-section images.

Figure 11:
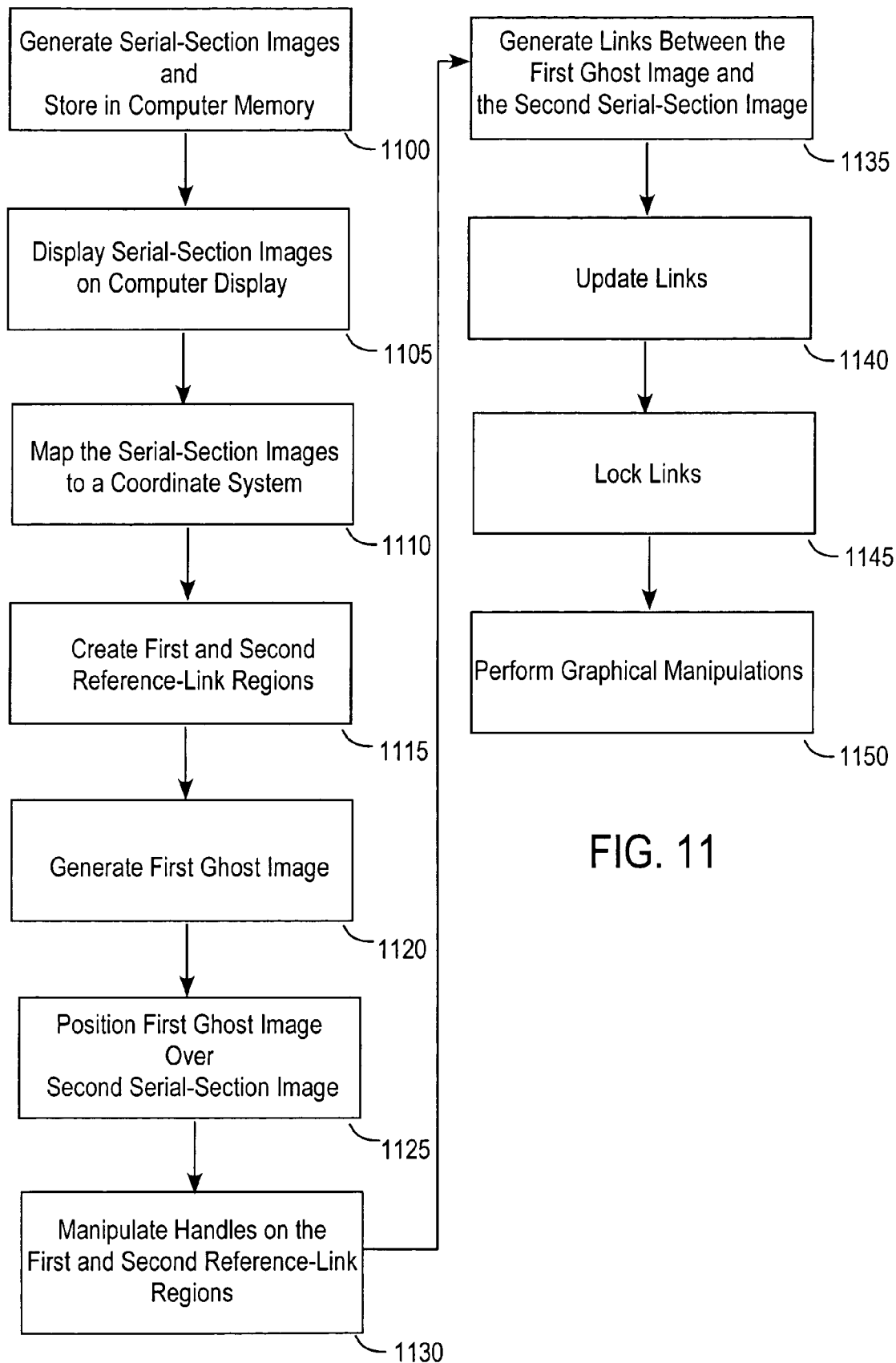
FIG. 11 is a high-level flow chart having steps for registering disparately shaped serial-section images according to another embodiment of the present invention.

FIG. 11 is a high-level flow chart having steps for registering, linking, and locking first and second serial sections images. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. According to an initial step 1100, the serial-section images are generated and stored in a computer. In a subsequent step 1105, the serial-section images are read from a computer memory and displayed in a window or in a set of windows on a computer display, which is controlled by the computer. Either prior or subsequent to displaying the serial-section images, pixel-image data of the images are mapped to a coordinate system, step 1110. Subsequently, first and second reference-link regions are generated and positioned over the first and second serial-section images, respectively, step 1115. A copy of the first serial-section image is generated, which is referred to as the first ghost image, step 1120. A second ghost image of the second serial section may optionally be generated. The first ghost image is positioned over the second serial-section image, step 1125. Handles on the first and/or second reference-link regions are manipulated to shear, skew, and/or rotate the first ghost image and the second serial-section image, respectively, to approximately register the two images, step 1130. A set of links is established between the pixel-image data of the two images for pixel-image data assigned the same coordinates, step 1135. The coordinates and links are updated as the images are sheared, skewed, and/or rotated, step 1140. The links are locked subsequent to approximate registration of the two images, step 1145. Subsequently, either the first or second serial-section image is graphically manipulated causing the other serial-section image to be similarly graphically manipulated, step 1150.

Figure 12:
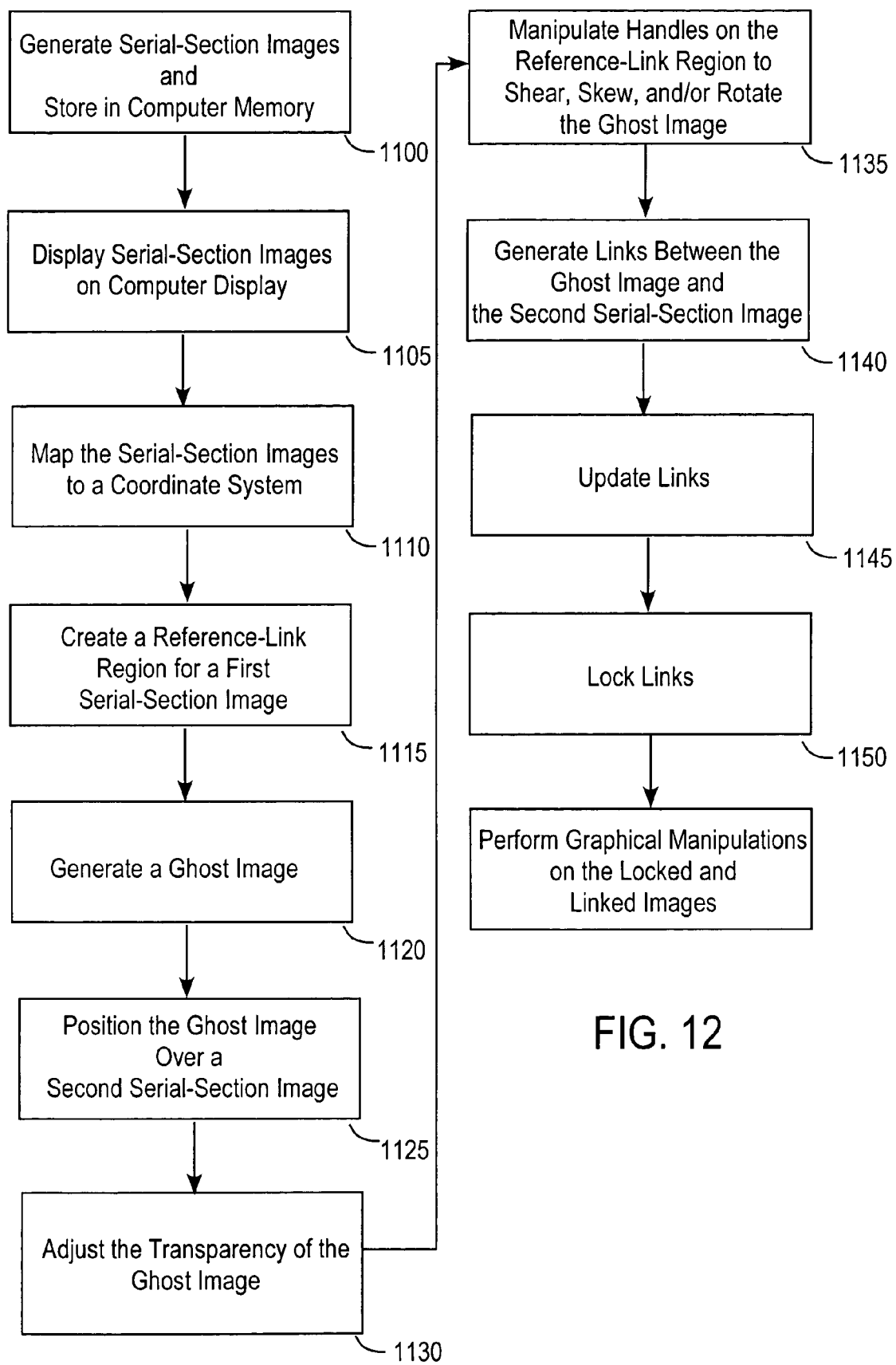
FIG. 12 is a high-level flow chart having steps for registering disparately shaped serial-section images according to another embodiment of the present invention.

FIG. 12 is a high-level flow chart having steps for registering, linking, and locking first and second serial-section images according to another embodiment of the present invention. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. According to an initial step 1200, the serial-section images are generated and stored in a computer. In a subsequent step 1205, the serial-section images are read from a computer memory and displayed in a window or in a set of windows on a computer display, which is controlled by the computer. Either prior, or subsequent to displaying the serial-section images, pixel-image data of the images are mapped to a coordinate system, step 1210. Subsequently, a reference-link region is generated and positioned over the first serial-section image or a portion thereof, step 1215. A copy of the first serial-section image is generated, which is referred to as the ghost image, step 1220. The ghost image is positioned over the second serial-section image, step 1225. The transparency of the ghost image is increased to provide a relatively clearer view of the second serial-section image, step 1230. One or more handles on the reference-link region are manipulated to shear, skew, and/or rotate the ghost image to approximately register the ghost image and the second serial-section image, step 1235. A set of data links is established between a first set of pixel-image data of the ghost image and a second set of pixel-image data for the second serial-section image for pixel-image data of the first and second sets of pixel-image data that are assigned the same coordinates, step 1240. The coordinates and links are updated as the images are sheared, skewed, and/or rotated, step 1245. The links are locked subsequent to approximate registration of the ghost image and the second serial-section image, step 1250. Subsequently, either the first or the second serial-section image is graphically manipulated causing the other serial-section image to be similarly graphically manipulated, step 1255.

CONCLUSION

It is understood that the examples and embodiments described above are for illustrative purposes only and that various modifications or changes in light thereof will be suggested to persons skilled in the art and are to be included within the spirit and purview of this application and scope of the appended claims. For example, while linking and locking and serial-section images have been characterized as different steps, these steps may be combined. For example, images may be linked by pushing and holding a button on a mouse as the ghost image is dragged over an underlying image, and the links may be locked by releasing the mouse button. Therefore, the above description should not be taken as limiting the scope of the invention as defined by the claims.

What is claimed is:

1. A computerized method for linking digitized images of serial sections of a biological tissue sample such that the digitized images of the serial sections are displayed on a computer display that is controlled by a computer, the method comprising:

creating a copy of a digitized image of a first serial section, the copy being referred to as the ghost image, wherein the digitized image of the first serial section includes at least a first set of image data and a second set of image data that have different image-density information;

positioning the ghost image over a digitized image of a second serial section, the digitized image of the second serial section being visible through the ghost image and being referred to as the underlying image;

changing the transparency of the ghost image to effect change of the visualization of the underlying image;

registering the ghost image to the underlying image;

linking the ghost image and the underlying image such that when manipulations are performed on either the ghost image or the underlying image, the other of the images is similarly manipulated;

scanning the first serial section at a first magnification to generate the first set of image data; and scanning the first serial section at a second magnification to generate the second set of image data, wherein the first magnification is greater than the second magnification, and wherein a data density of the first set of image data is greater than a density of the second set of image data.

2. The method of claim 1, wherein the step of changing the transparency of the ghost image includes increasing the transparency of the ghost image to increase the visualization of portions of the underlying image that underlie the ghost image.

3. The method of claim 2, wherein the step of changing the transparency of the ghost image includes sliding a slider of a slider bar that is displayed on the display.

4. The method of claim 2, and further comprising displaying on the display a transparency percentage of the ghost image.

5. The method of claim 2, wherein the step of changing the transparency of the ghost image includes decreasing the transparency of the ghost image to increase the visualization of the ghost image.

6. The method of claim 1, wherein a default transparency of the ghost image is approximately fifty percent.

7. The method of claim 1, and further comprising selecting at least a portion of the first set of image data and at least a portion of the second set of image data to form the ghost image.

8. The method of claim 1, wherein the ghost image includes all available image data for the digitized image of the first serial section.

9. The method of claim 8, and further comprising selecting an option displayed on the display to include all available image data for the digitized image of the first serial section in the ghost image.

10. The method of claim 8, and further comprising magnifying the ghost image, wherein the ghost image prior to magnification and subsequent to magnification have approximately the same resolution.

11. The method of claim 1, wherein the step of changing the transparency of the ghost image includes decreasing the transparency of the ghost image.

12. The method of claim 1, and further comprising rotating the ghost image to refine the registration of the ghost image to the underlying image.

13. The method of claim 12, wherein the copying step includes positioning a reference-link region on the digitized image of the first serial-section image to create the ghost image.

14. The method of claim 13, wherein the reference-link region includes a graphical user interface (GUI) button that is configured to be pressed and dragged by a cursor to rotate the ghost image.

15. The method of claim 13, wherein the ghost image is configured to rotate about a center position of the reference-link region.

16. The method of claim 13, wherein the GUI button is disposed on a top boundary of the reference-link region.

17. The method of claim 1, wherein the copy of the digitized image of the first serial section is a copy of a portion of the first image of the first serial section.

18. The method of claim 1, wherein the registering step includes shearing or skewing the ghost image.

19. The method of claim 1, wherein the registering step includes manipulating at least one handle of a set of handles on the reference-link region to shear or skew the ghost image.

20. The method of claim 1, wherein linking the ghost image and the underlying image includes generating data links between image data of the ghost image and the underlying image.

21. The method of claim 20, and further including locking the data links between the ghost image and underlying image such that the data links do not change during manipulation of the ghost image and underlying image.

* * * * *